(12) United States Patent
Matsuoka et al.

(10) Patent No.: US 6,920,145 B2
(45) Date of Patent: Jul. 19, 2005

(54) PACKET SWITCH DEVICE AND SCHEDULING CONTROL METHOD

(75) Inventors: Naoki Matsuoka, Kawasaki (JP); Hiroshi Tomonaga, Kawasaki (JP); Kenichi Kawarai, Kawasaki (JP)

(73) Assignee: Fujitsu limited, Kawasaki (JP)

( * ) Notice: Subject to any disclaimer, the term of this patent is extended or adjusted under 35 U.S.C. 154(b) by 755 days.

(21) Appl. No.: 09/759,181

(22) Filed: Jan. 12, 2001

(65) Prior Publication Data

US 2001/0007562 A1 Jul. 12, 2001

(30) Foreign Application Priority Data

Jan. 12, 2000 (JP) ...................................... 2000-006360

(51) Int. Cl.[7] .............................................. H04L 12/56
(52) U.S. Cl. ...................... 370/412; 370/414; 370/415
(58) Field of Search ................................ 370/389, 412, 370/414, 415

(56) References Cited

U.S. PATENT DOCUMENTS

| | | | | |
|---|---|---|---|---|
| 5,517,495 A | * | 5/1996 | Lund et al. | 370/414 |
| 6,611,527 B1 | * | 8/2003 | Moriwaki et al. | 370/412 |
| 6,704,312 B1 | * | 3/2004 | Chang et al. | 370/389 |

FOREIGN PATENT DOCUMENTS

JP          05181817          7/1993

OTHER PUBLICATIONS

Mekkitikul, "Scheduling Non Uniform Traffic in High Speed Packet Switches and Routers" Nov. 1998 XP002269673.

Marsan, et al., "Scheduling in Input Queued Cell Based Packet Switches" Globecom 99, Dec. 1999 pp. 1227–1235, XP002269673.

Kawaeai, et al., "Terabit Switch Architecture Using Input Queing Technique" Sep. 1999; Proceedings of ICCC 99 vol. 15, No. 4, pp. 124–128, XP009023676.

McKeown, et al., "Tiny Tera: A Packet Switch Core" IEEE Micro, vol. 17, No. 1, 1997, pp. 26–33; XP000642693, ISSN:0272–1732.

* cited by examiner

*Primary Examiner*—Salvatore Cangialosi
(74) *Attorney, Agent, or Firm*—Katten Muchin Zavis Rosenman

(57) ABSTRACT

A packet switch device having a plurality of input buffers; a packet switch; a plurality of schedulers, having a pipeline scheduling process module wherein a plurality of time units corresponding to the number of output lines is spent in scheduled sending process of the fixed length packets from the input buffer, and wherein the scheduled sending process is executed in a number of processes, in parallel, the number of processes corresponding to the number of the input lines, having a sending status management module wherein sending status of the fixed length packets which constitute one frame is managed for each of the input lines, and provided corresponding to any of the output lines; and at least one result notification module for notifying the input buffer of result information from the scheduled sending process performed by each of the plurality of schedulers. Further, in the scheduled sending process executed in a number of processes, in parallel, the device does not select the input line sending the fixed length packets corresponding to the same frame, and, after determining a selection, the device maintains the selection of the same input line until the completion of sending the fixed length packets corresponding to the same frame.

11 Claims, 19 Drawing Sheets

FIG.5
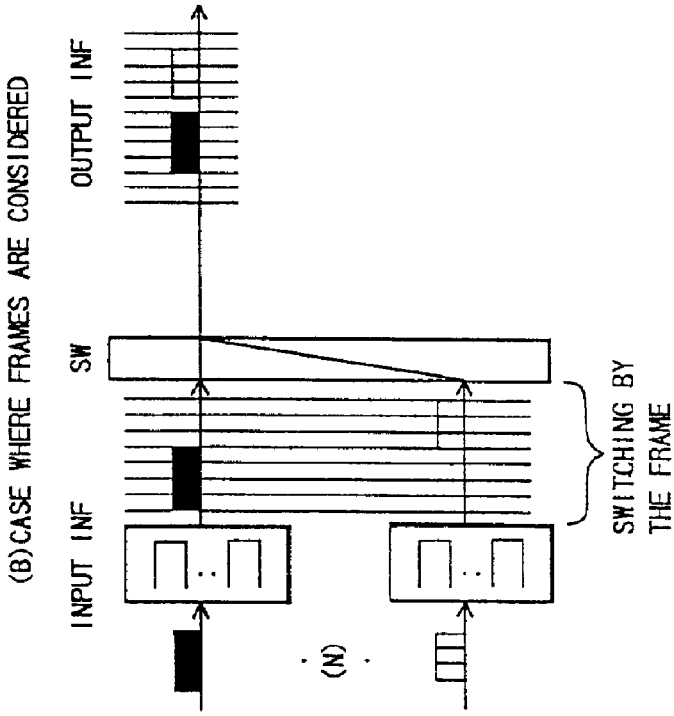
(B) CASE WHERE FRAMES ARE CONSIDERED
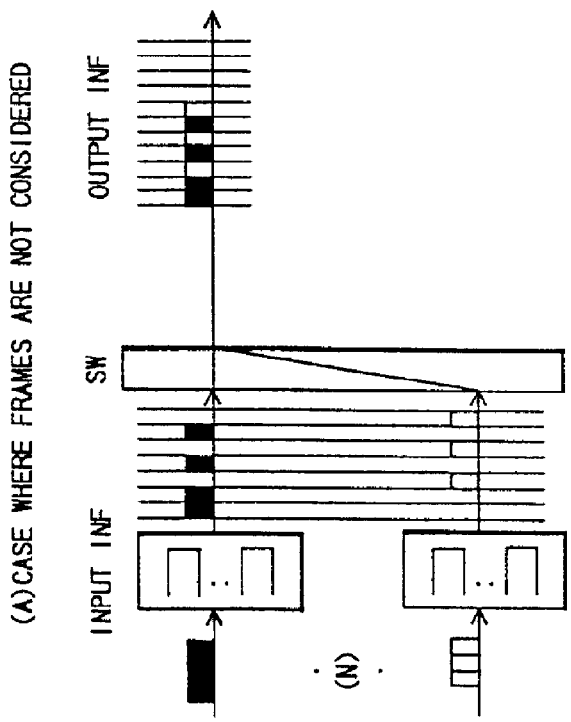
(A) CASE WHERE FRAMES ARE NOT CONSIDERED

PACKET SWITCH DEVICE AND SCHEDULING CONTROL METHOD

BACKGROUND OF THE INVENTION

This invention relates to a packet switch device for transmission of (including exchange, communication, and forwarding, unless specifically limited) fixed length packets, which is applied in a broadband switch, a cross connect switch device, a router device, etc., and more particularly relates to an input buffer type packet switch device as one of the configuration methods of a large scale packet switch device.

In further details, this invention relates, as a packet switch device (an ATM switch device) that performs switching of fixed length packets called cells, to a packet switch device that enables efficient transmission of variable length packets such as IP (Internet Protocol) packets when they are input.

Along with the spread of the Internet in recent years, the IP data traffic (including voice information) in IP communications network systems is increasing at a great rate. In several years it's considered that IP traffic will become the major part of the communication traffic.

One element in this background is that, along with the progress of network technology, whose first example is bandwidth broadening of local area networks (LAN), and further examples in PC technology, such as the increasing functionality of personal computers (PCs) and speed increases of CPUs applied in PCs, it has become possible in practice to communicate not only data but also voice information between PCs across multiple LANs at high speeds.

Based on this, application software for executing voice communications, which conventionally were carried out by telephone, between PCs over the Internet constituted by leased lines, LANs, wide area networks (WANs), etc. and hardware which incorporates such software is being rapidly launched into the market. This system is a composite switching network system, or IP communications network system, which allows reduction of equipment and operations costs by integrating telephone networks and IP packet networks such as the Internet.

In a situation where, as described above, diversification and expansion of the communications network infrastructure is taking place, corporations are endeavoring to realize large-scale packet switch devices that are capable of transmitting IP packets in high volume and efficiency in order to cope with the ever-increasing volume of communication traffic.

IP packets are transmitted in the form of variable length packets. However, since strictly switching such variable length packets requires the processing of every byte, it is generally necessary to use a high-speed process, in which high-speed switching is difficult.

Therefore, in a technique to switch variable length packets at a high speed, variable length packets are divided in a similar manner as cells into 53-byte, fixed length packets on which fixed packet switching is performed inside the packet switch device. However, when sending data from the packet switch device, it is necessary to reconstruct such divided, fixed length packets into the variable length packets of original lengths to transmit them.

Here, two techniques of conventional packet switching devices are described with reference to FIG. 1, which shows forward variable length packets that are divided into fixed length packets.

(1) The scheduler part (not illustrated), at the input interface part (input INF) having an input buffer part, performs scheduling for each of the divided fixed length packets without considering the frames (variable length data constituted by a plurality of fixed length packets is scheduled without considering how the fixed length packets relate to the frames) and then inputs them to the packet switch (SW) as the common switch part. Furthermore, at the output buffer part provided for frame construction in the output interface part (output INF) in the stage after the packet switch (SW), the scheduler waits for the packets in order to construct the frames (refer to FIG. 1 (A)).

(2) The scheduler part (not illustrated), in the input interface part (input INF) having an input buffer part, considering the frames, performs successive scheduling packets constituting the same frame, and then inputs them into the packet switch (SW). Furthermore, after performing switching by the packet switch (SW) on the frame unit, it sends the frames to the output lines (output route) through the output interface part (output INF) (refer to FIG. 1 (B)).

In the technique (1) above, since the frames are not considered upon scheduling, scheduling is executed in each of the fixed length packets. Therefore, a pipeline process can be applied to perform scheduling advanced from the next cycle arranging scheduling processes in parallel, giving it an advantage of an increased processing speed. On the other hand, at the output interface part, packets are sent by the frame, which makes it necessary to temporarily store the fixed length packets from each of the input lines (input route) to construct the frames.

In a packet switch device adopting this technique, buffer memories, corresponding to the number of the input lines, are required for each of the output interface parts for constructing the frames. Therefore, a device having a large scale of switching requires a large quantity of output buffer memories.

On the other hand, with regard to technique (2) above, switching by the frame has an advantage of not requiring output buffer parts for the reconstruction of frames in the output interface parts. However, in order to realize scheduling by the frame, it is prohibited for other output lines to perform scheduling on an input line through which a frame is sent. Furthermore, once an input line is determined, it is required to perform scheduling continuously until sending of a frame is completed.

Therefore, upon scheduling, it is necessary to refer to the most up-to-date information as to which input line is currently sending a frame to which output line and it is not possible to perform advanced scheduling of the next cycle by arranging scheduling processes in parallel as in a pipeline process as describe above. As a result, a high speed scheduler part which executes scheduling of all lines within a unit of time is necessary, which is difficult to realize in a large scale packet switch device.

SUMMARY OF THE INVENTION

An object for the present invention is to provide, in packet switch devices that perform switching of fixed length packets, a packet switch and a scheduling control method which make possible efficient transmission of variable length packets when variable length packets such as IP packets are input.

Another object for the present invention is to provide a packet switch device and a scheduling control method which, while reducing processing speed by utilizing a pipeline process, makes possible a scheduling process by frame.

The other object for the present invention is to provide a packet switch device and a scheduling control method which do not require output buffers for constructing frames.

To accomplish the above objects, a first packet switch device of the present invention comprises a plurality of input buffers, provided corresponding to any of a plurality of input lines, each of the input buffers having a buffer memory that is logically divided into queues corresponding to a plurality of output lines, for temporarily storing packets, the packets being input via the corresponding plurality of input: lines, into the buffer memory in a form of a fixed length packet, a packet switch for performing switching operations to send the fixed length packets which are sent from the plurality of input buffers, to one of the plurality of output lines, a plurality of schedulers, having a pipeline scheduling process module in which a plurality of time units corresponding to the number of the output lines is spent in a scheduled sending process the fixed length packets from the input buffer, and in which the scheduled sending process is executed in a number of processes in parallel corresponding to the number of the input lines, and having sending status management module which manages a sending status of the fixed length packets constituting one frame for each of the input lines, wherein the plurality of schedulers are provided corresponding to any of the output lines, and at least one result notification module for notifying the input buffer part of result information from the scheduled sending process performed by each of the plurality of schedulers; wherein in the scheduled sending process executed in a number of processes in parallel, the input line sending the fixed length packets corresponding to the same frame is not selected, and wherein, after determining a selection, the selection of the same input line is maintained until the completion of sending the fixed length packets corresponding to the same frame.

In a second packet switch device of the present invention, as according to the first packet switch device above, each of the schedulers further has a request management part for managing requested transfer information of the fixed length packets stored in the input buffer for each of the input lines, and the pipeline scheduling process module decides at the input buffer corresponding to the input line to send the fixed length packets on the basis of the requested transfer information from the request management module, undetermined selection information inputted through a transmission medium annularly connecting between the schedulers, and sending status information inputted in the sending status management through a transmission medium connecting the schedulers with one another.

In the first and the second packet switch devices of the present invention, the scheduling process is executed in a number (N) of processes in parallel corresponding to the number of input lines. Furthermore, by referring to the sending status management where a frame sending status common to all schedulers are set, if self-scheduler is sending a frame, the selection of the same input line is continued; if not, it is intended that no input lines through which frames are being sent will be selected. As a result, it is possible to continuously read out fixed length packets constituting one frame. In addition, process speed can be reduced by parallel processing.

In a third packet switch device of the present invention, as according to the first packet switch device above, the result notification module has a control unit for controlling whether or not the input buffer is sending the fixed length packets that constitute one frame based on the result information from the scheduled sending process, and a discarding process unit, when notifying the result information in each of the plurality of schedulers to the corresponding the input buffers, for discarding the result information inputted from a different the scheduler while sending the fixed length packets that constitute a frame.

In the third packet switch device of the present invention in parallel processing N processes, if a plurality of schedulers simultaneously performs scheduling for the same input line, in the result notification module (result changeover module), it is intended that scheduling results notified afterwards will be discarded so that there will be only one scheduling result that will be reported to the input buffer. Therefore, even if a collision occurs in each parallel processing, readout by the frame can be maintained.

A fourth packet switch device of the present invention, as according to the first packet switch device above, comprising a unit for providing the schedulers and the result notification modules corresponding to any of the output lines and for continuously connecting them in an expanded manner as the plurality of output lines increases.

In the fourth packet switch device of the present invention, it is intended that the schedulers and the result notification modules will be positioned in a distributed manner by each of output lines. Thus, when expanding the scale of the switch, by adding new schedulers and result notification modules, an online expansion of the scheduler will be possible.

In a fifth packet switch device of the present invention, as according to the first packet switch device above, the fixed length packets includes the first packet constituting a frame and being divided in a plurality, and the second packets each constituting a frame, wherein a unit for adding a frame end identifier to each of the second packets is provided at the front stage of the input buffers.

In the fifth packet switch device of the present invention, for fixed length packets such as ATM cells, etc. that do not require conversion to frames, it is intended that information to indicate the last packet of a frame will be given. Therefore, in the schedulers, since these packets are treated as having uniform length frames, it is possible to process them in a unified manner without considering fixed length packets or variable length packets.

In a sixth packet switch device of the present invention, as according to the first packet switch device above, the pipeline scheduling process module manages, according to the QoS class, the requested transfer information sent from the input buffers, and the pipeline scheduling process performs the scheduling process for sending with respect to the QoS class selected based on the results of both QoS bandwidth control and QoS priority control in the output lines.

In the sixth packet switch device of the present invention, it is intended that the requested transfer information coming from the input buffers will be managed for each input line and for each QoS class. Furthermore, it is intended that scheduling will be performed on the QoS class selected through QoS control such as bandwidth and priority controls. Therefore, in the input buffers, it is possible to realize QoS control over the output lines of the packet switch, to limit the point of quality degradation to the input buffer only, and to easily realize controls such as call-reception control.

In a seventh packet switch device of the present invention, as according to the first packet switch device above, each of the schedulers further has a load observation module for counting the number of occurrences of requested transfer information inputted from the input buffers within a predetermined time, and an observation result reflecting module for instructing the timing to notify the observation result to the pipeline scheduling process module, the timing being shifted by a unit of time for each of the input buffers, wherein the input buffer corresponding to the input line is selected according to the proportion of the number of occurrences of the requested transfer information that is observed.

The seventh packet switch device of the present invention comprises the load observation module for counting, the number of occurrences of requested transfer information inputted from the input buffers by each input line, and it reflects the counted number of requests to the pipeline scheduling process module in a certain cycle. It is intended that the timing of reflection will be delayed by a unit of time for each of the input lines. Because of this, the timing of one reflection does not overlap with the timing of other reflections, which allows easy processing even if there are large number of input lines.

In an eighth packet switch device of the present invention, as according to the packet switch device above, for switching a frame of variable length data from input lines to output lines, the frames of variable length data being converted to a plurality of fixed length packets on each of which switching is performed, wherein a plurality of input buffers are provided, each of the plurality of input buffers corresponding to one of a plurality of input lines, and a scheduler is provided so as to schedule the fixed length packets generated from the same the frame so that the fixed length packets are continuously read out until sending of the fixed length packets to the same output line is completed, and wherein, according to the instruction from the scheduler, fixed length packets are read out from each of the input buffers and switched.

The eighth packet switch device of the present invention allows successive readouts of fixed length packets constituting one frame.

A first scheduling control method of the present invention comprises the steps of spending a plurality of time units corresponding to the number of the output lines in scheduled sending process the fixed length packets from the plurality of input buffers, and executing the scheduled sending process in a pipeline process executed in a number of processes in parallel corresponding to the number of the input lines, wherein a plurality of input buffers are provided corresponding to any of a plurality of input lines, each the input buffer having a buffer memory that is logically divided into queues corresponding to a plurality of output lines, and wherein the plurality of input buffers temporarily store packets, the packets being input via corresponding the plurality of input lines, into the buffer memory in a form of a fixed length packet, controlling, for each of the input buffer parts, the sending status of the fixed length packets constituting one frame, notifying the result information of the scheduled sending process to corresponding the input buffers, and in the scheduled sending process executed in a number of processes in parallel, not selecting the input line sending the fixed length packets corresponding to the same frame, and, after determining a selection, and maintaining the selection of the same input line until the completion of sending the fixed length packets corresponding to the same frame.

In the first scheduling control method of the present invention, a similar effect as the first packet switch device above can be expected.

A second scheduling control method of the present invention, as according to the first scheduling control method above, further comprising steps of managing, for each of the QoS classes, the requested transfer information sent from the input buffers, and performing the scheduling process for sending with respect to the QoS class selected based on the results of both QoS bandwidth control and QoS priority control of the output lines.

In the second scheduling control method of the present invention, a similar effect as the sixth packet switch device above can be expected.

A third scheduling control method of the present invention, as according to the first scheduling control method above, further comprises steps of counting the number of occurrences of requested transfer information inputted from the input buffers within a predetermined time, instructing the timing to reflect the observation result to the scheduling process for sending, the timing being shifted by a unit of time for each of the input buffers, and selecting the input buffer according to the proportion of the number of occurrences of requested transfer information that is observed.

In the third scheduling control method of the present invention, a similar effect as the seventh packet switch device above can be expected.

A fourth scheduling control method of the present invention, in a packet switch device for switching a frame of variable length data from input lines to output lines, the frames of variable length data being converted to a plurality of fixed length packets on each of which switching is performed, comprises steps of storing the fixed length packets, input from a plurality of input lines, in an input buffer provided for each input line, scheduling the fixed length packets generated from the same frame so that the fixed length packets are continuously read out until sending of the fixed length packets to the same output line is completed, and reading the fixed length packets from the input buffer instructed by the scheduling.

In the fourth scheduling control method of the present invention, a similar effect as the eighth packet switch device above can be expected.

As described above according to the present invention, executing scheduling by the frame in parallel processing not only makes it possible to eliminate the buffer for construction of frames on the output line side, but also gives an expectation for reduction effect in processing speed. As a result, effective reception of variable length packets such as IP packets in high volume packet switch devices can be realized.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 5 is a diagram for describing scheduling by the frame;

DESCRIPTION OF THE PREFERRED EMBODIMENTS

Figure 1:
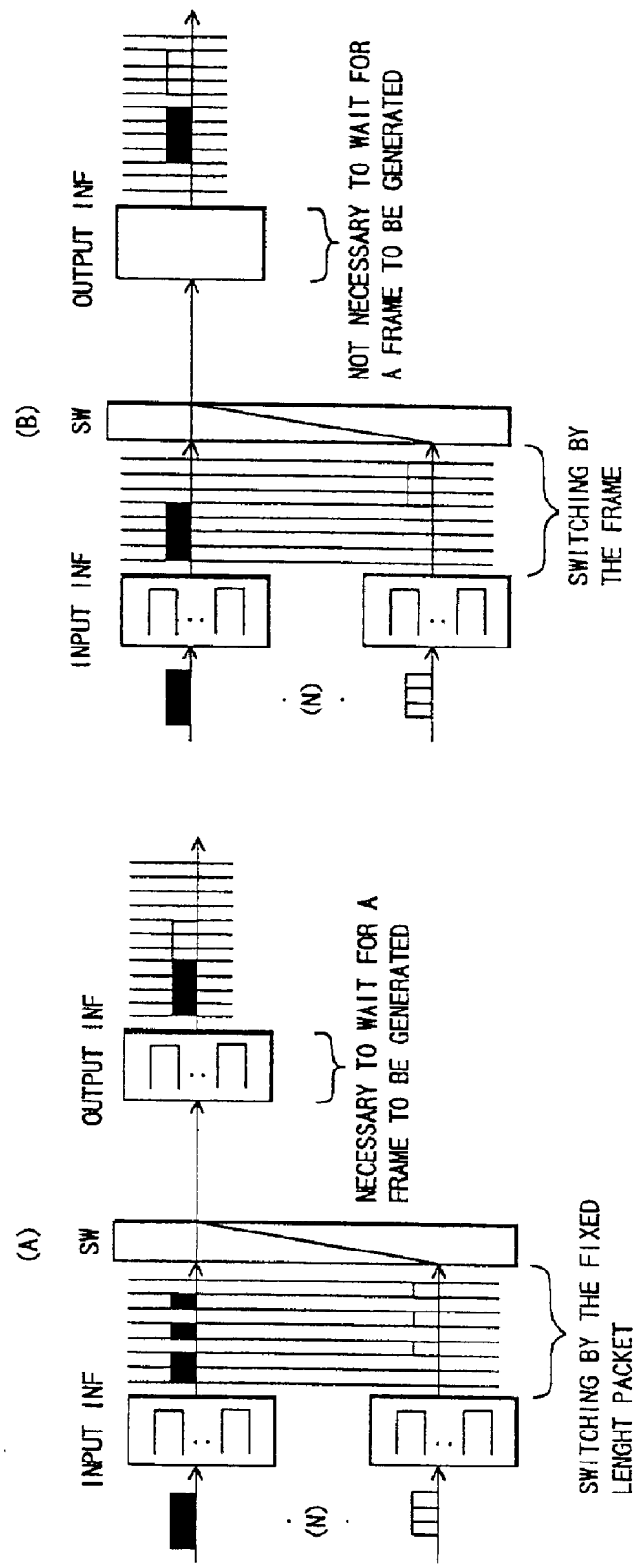
FIG. 1 is a block diagram showing configurations of conventional packet switching devices.

Embodiments of the present invention will be described referring to the drawings.

Overall Configuration

Figure 2:
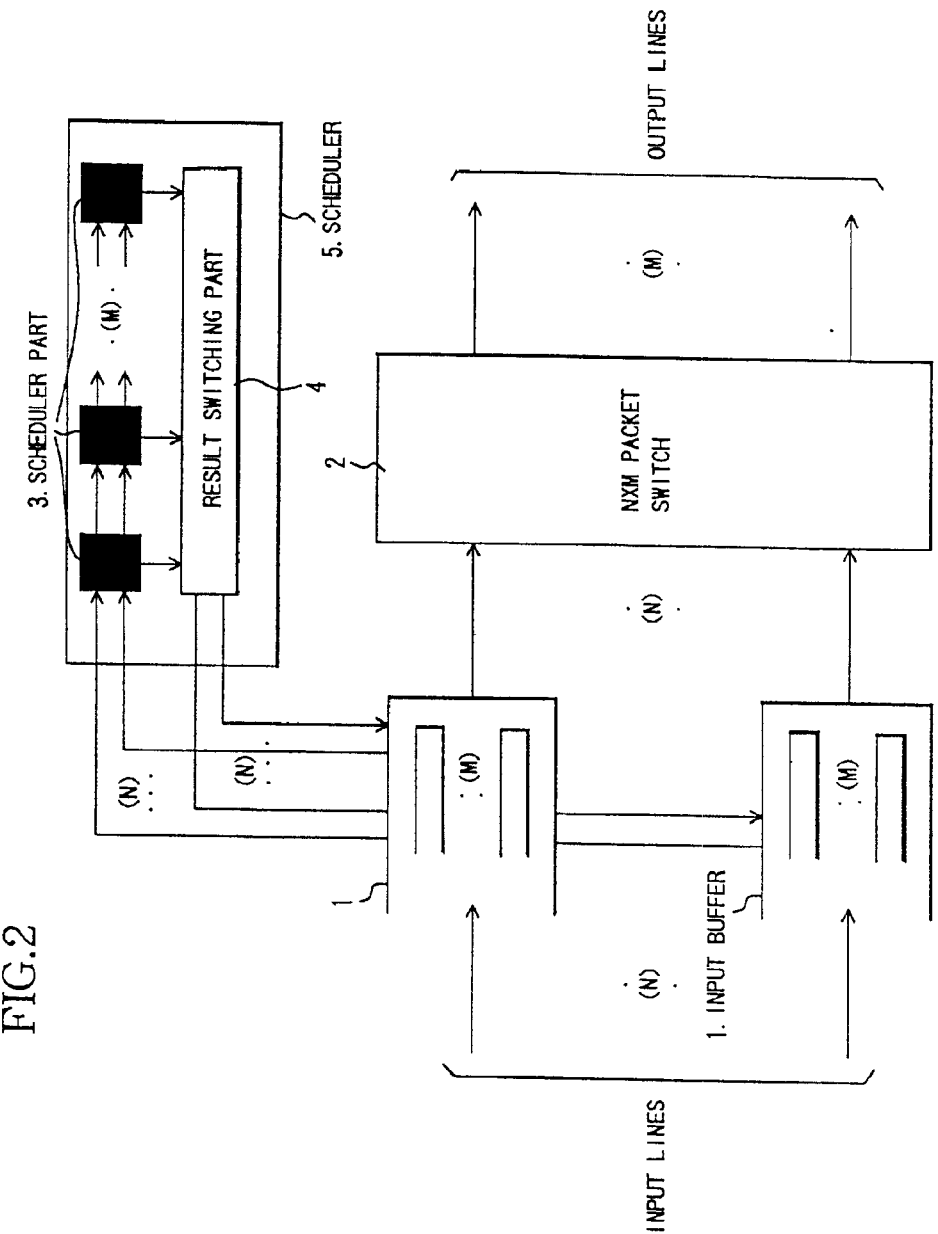
FIG. 2 is a block diagram showing a packet switch device as one embodiment of the present invention.

Referring to FIG. 2 which shows the overall configuration of a packet switch device as one embodiment of the present invention, an input buffer type packet switch device comprises: a plurality of (N) input buffer parts 1, a packet switch of input N×output M matrix (common switch) 2, a plurality of (M) schedulers 3, and a result switching part 4.

Here, an input buffer part 1 of the N number of input buffer parts 1 are provided to each of the N input interface parts (Input INF in FIG. 5), which correspond to the plurality of (N) input lines (input route). The M scheduler parts 3 and the result switching part 4 constitute the scheduler (scheduling control device) 5. The plurality of (M) output lines (output route) from the packet switch of N×M matrix 2 is received by the output interface part (Output INF in FIG. 5).

Each input buffer part 1 performs buffering of fixed length packets (hereafter written as "packets" unless it is necessary to specifically indicate) from the corresponding input line for each of the logical queues (FIFO buffer memories) corresponding to the M output lines. The packet switch 2 as the core switch performs, according to the routing bit of the packet header, switching of the packets read out from the input buffer parts 1.

Each of the scheduler parts 3, when receiving sending requests (requested transfer information) from the input buffer parts 1, controls readouts to avoid collisions in the output lines of the packet switch 2. The result switching part 4 notifies the scheduling result (scheduling result information) for each of the output lines received from the scheduler parts 3 to the corresponding input buffer parts 1. The output interface part has a logical multiplexing division (DMUX) for the low speed lines.

In the input buffer type packet switch device described above, while realizing low memory access speed as a basic feature of an input buffer type packet switch device configuration by providing to each of the input buffer parts 1 logical queues for each of the output lines, it is possible to avoid HOL (head of line) blocking. In addition, since the memory access speed is low, general purpose RAMs can be applied to the input buffer parts 1 and a large capacity buffer memory can be realized.

Basic Configuration of the Scheduler Part

Figure 3:
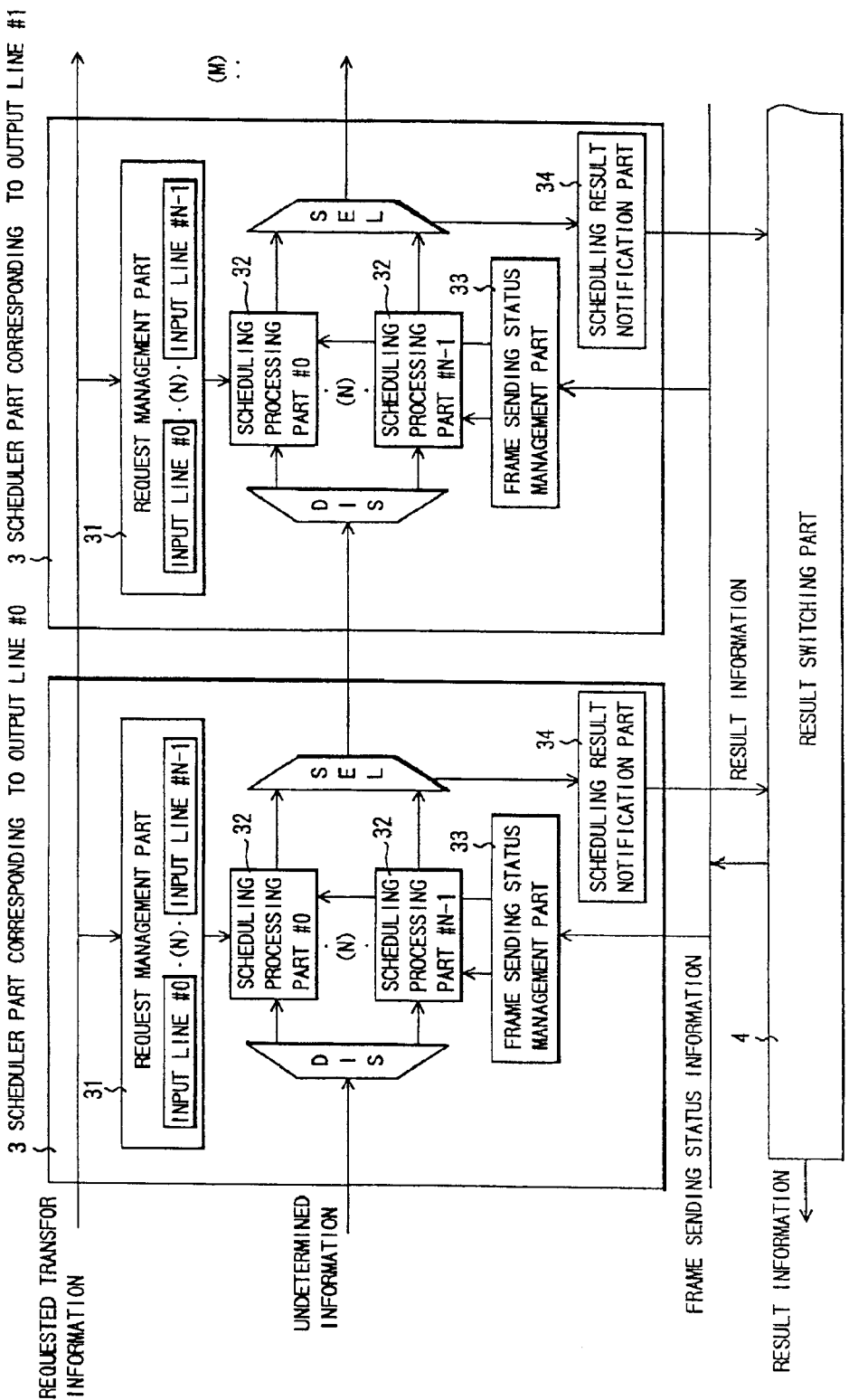
FIG. 3 is a block diagram showing the basic configuration of the scheduler parts shown in FIG. 2.

Each of the scheduler parts 3 mentioned above adopts the basic configuration as shown in FIG. 3. The M number of scheduler parts 3, each of which is provided corresponding to one of the M number of output lines, have the same configuration. In each scheduler part 3, the request management part 31 controls, for each of the input lines (#0 ... #N−1), requested transfer information sent from the input buffer parts 1. The N scheduling process parts (#0 ... #N−1) 32 process scheduling for an output line, to which one processing part correspond, in N processes, in parallel. The frame sending status management part 33 manages the input line number and the output destination (output line number through which a frame is currently sent) during the sending of a frame.

The scheduling result notification part 34 holds, for each sequence (pipeline process), the scheduling result information determined by the scheduling process part 32, and it sends the scheduling result information (including input line number and scheduler number) to the result switching part 4 at predetermined time. In FIG. 3, DIS is a distributor part and SEL is a selector.

The scheduling process part 32 determines the input line through which packets are sent based on the undetermined selection information input through the link annularly connecting the scheduler parts, the frame sending status information input to the frame sending status management part through the bus connecting the scheduler parts 3 with one another, and the requested transfer information sent from the input buffer parts 1.

Basic Configuration of the Result Switching Part

Figure 4:
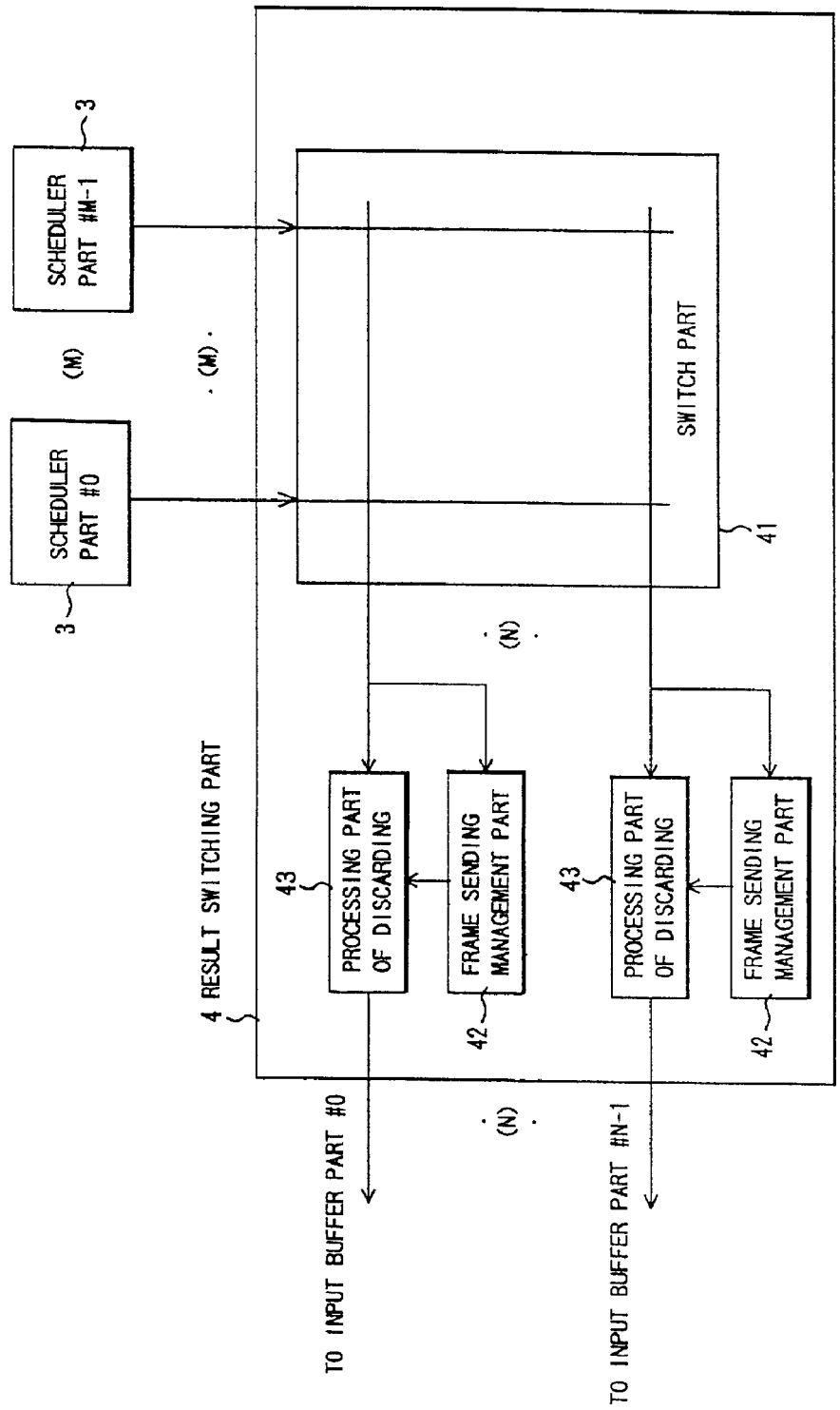
FIG. 4 is a block diagram showing the basic configuration of the result switching part shown in FIG. 2.

The result switching part 4 mentioned above adopts the basic configuration as shown in FIG. 4. In the result switching part 4, the switch part 41 performs switching of the scheduling result information including input line number and scheduler number which is input from the scheduler part 3 to the route for the input buffer part 1 which is to be notified. The frame sending management parts 42 are provided in a quantity N corresponding to the number of input buffer parts 1. Each frame sending management part 42 manages whether or not the corresponding input buffer part 1 is sending a frame.

The discarding processing part 43 is provided in a quantity N corresponding to the number of input buffer parts 1. Each discarding processing part 43 discards scheduling result information according to the instruction of the frame sending management part 42. The result switching part 4 notifies scheduling result information from scheduler parts 3 to each input buffer part 1, and at the same time, if a request is input from a different scheduler part 3 while a frame is being sent, it performs collision control by discarding such a result.

Scheduling Process

Referring to FIG. 2 and FIG. 5 together, a description will be given concerning the control where a plurality of fixed length packets constituting one frame is successively read out.

Each of the input buffer parts 1 provided in the input interface part (input INF) of the input buffer type packet switch device has a plurality of logical queues (FIFO buffer memories) logically divided for each of the output lines (output route). If the scheduler part 3 performs scheduling without considering the frame, as shown in FIG. 5 (A), on one output line of the packet switch (SW) 2, the constitution of a frame will be broken due to the packets arrived from other input lines.

In order not to break the constitution of frames, as shown in FIG. 5 (B), when the sending of packets from one input line to one output line is started, scheduling must be performed in such a way that the packets from the same input line are always sent to the same output line.

For this reason, the scheduler part 3, for an input line which has been determined once, performs the continuous scheduling of packets from the same input line until all of such packets constituting one frame are completely sent. At the same time, while an input line is in an undetermined condition (unscheduled), the scheduler does not select an input line through which packets that constitute one frame are already being sent (hereinafter written as "a frame is being sent").

Next, the specific scheduling process will be described. Here, for simplicity, the description is based on the input buffer type packet switch device 1 which is of four input-four output configuration.

Referring to FIG. 2 and FIG. 3 together, when the output line number in the requested information which is input (arrived) from the input buffer part 1 matches self-scheduler number, the request management part 31 of the scheduler part 3 manages the number of requests by incrementing (+frame length) the counter corresponding to the input line number (can be judged from the input port number in the requested information), further by, based on the scheduling process, decrementing (−1) the counter corresponding to the input line which is determined.

Then, the request management part 31 judges that a request for scheduling exists when the number of the requests for one input line exceeds one. Requested information consists of: an output line number, a QoS class, and frame length, and the request management part is notified when the last fixed length packet arrives at the input buffer part 1.

Figure 6:
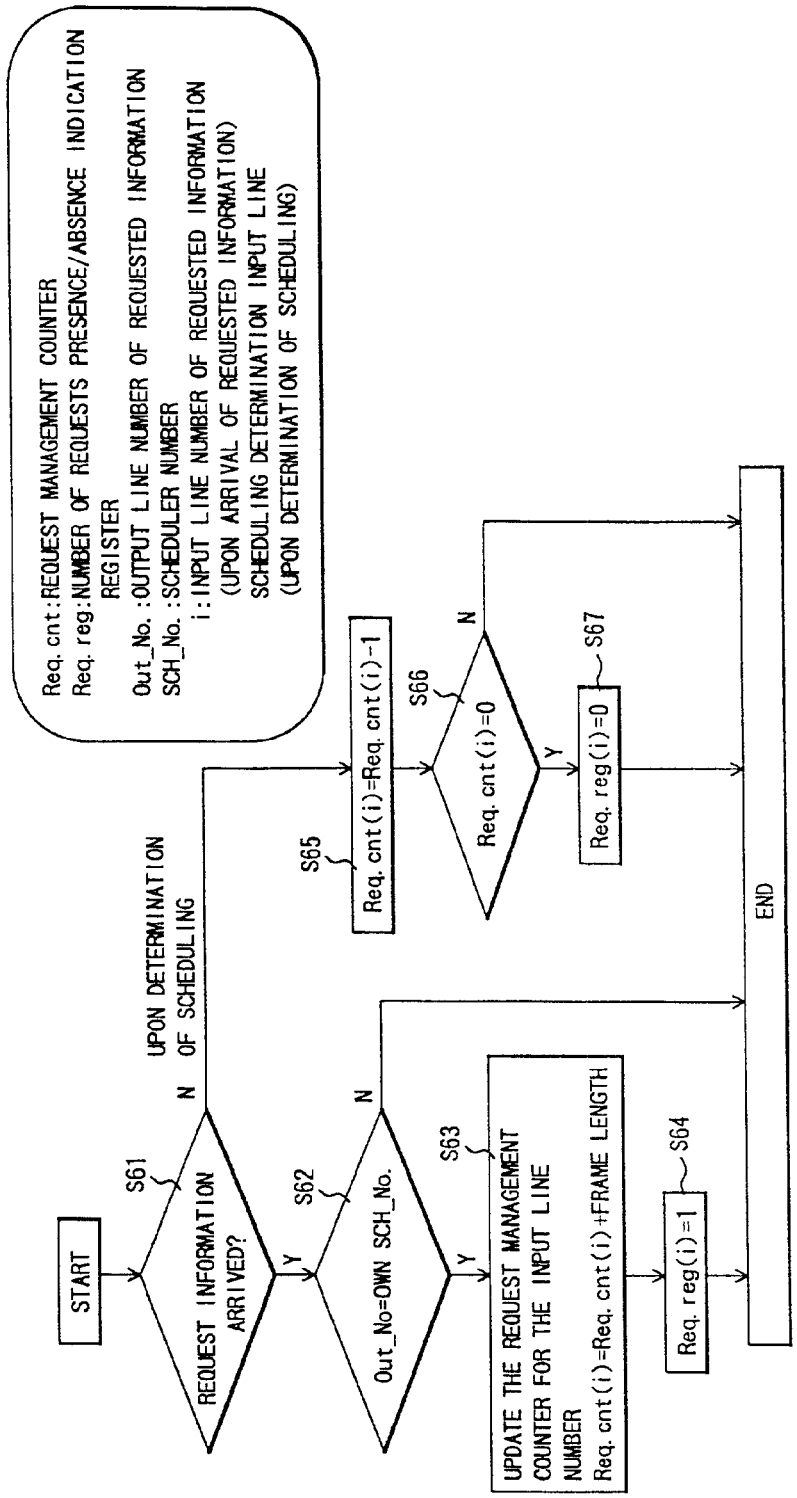
FIG. 6 is a flowchart for describing processing steps of the request management part.

Referring to FIG. 6 which shows the operation flow of the request management part 31, the request management part 31 judges whether there is an arriving event of requested information from the input buffer part 1 or an ending event of scheduling from the scheduler part 3 (processing step S61). Next, if the requested information has arrived from the input buffer part 1, it judges whether the arrived information is for self-scheduler (itself) or not by comparing the output line number Out-No., and with preset scheduler number SCH-No. (S62).

If the arrived information is not for its scheduler, it ends the process; if it is for self-schedule:r, it increments (+frame length) the request management counter, Req. cnt, corresponding to the input line number of the requested information. Next, it sets the flag for each input line showing more than one requests; in other words, it sets "1" to the number of requests presence/absence indication register, Req. reg, (S64).

On the other hand, upon an occurrence of an ending event of scheduling from the scheduler part 3 (S61), it decrements (−1) the request management counter Req. reg, corresponding to the determined input line (S65) (scheduled). Performing a "0" judgment of the content of the request management counter Req. reg, if the counter value is "1" or greater, the process is ended; if it is "0", it clears the flag to show presence or absence of number of requests. In other words, it sets "0" to the number of requests presence/absence indication register Req. reg, (S66, S67).

Figure 7:
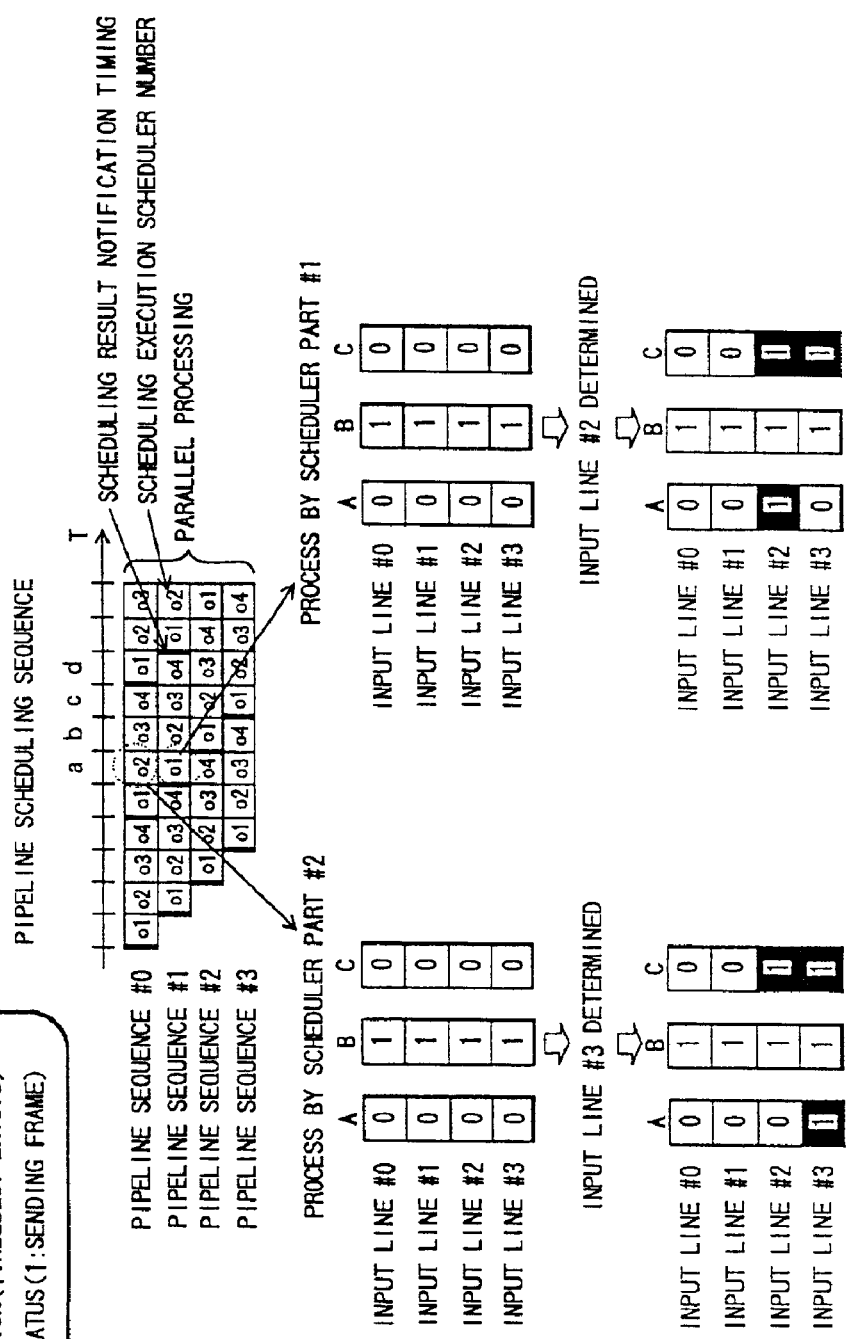
FIG. 7 is a diagram for describing a pipeline scheduling process.

Next, the scheduling process part 32 of the scheduler part 3, as indicated by the time slot diagram shown in the upper part of FIG. 7, realizes a scheduling process once by spending four time units and performing four processes in parallel. The scheduler number and the pipeline sequence as the subject of scheduling are given according to the process sequence common to all the schedulers (the time slot diagram in the upper part of FIG. 7). In this example, at time T=a, the processes of the pipeline sequence #0 of the output line #2, the pipeline sequence #1 of the output line #1, the pipeline sequence #2 of the output line #4, and the pipeline sequence #3 of the output line #3 will be executed in parallel.

When the scheduler part 3 receives an instruction for scheduling, it performs scheduling by referring to the undetermined selection information, the requested information, and the frame sending status information. All such information is stored in the bit-mapped registers corresponding to each of the input lines.

The undetermined selection information is stored in the register indicated as "A" in FIG. 7, and "0" or "1" is used to express if that input line is undetermined or already determined. The requested information is stored in the register indicated as "B" in FIG. 7, and, to express presence or absence of requests, "1" is set for the input line for which the number of requests in the request management part 31 is more than one. The frame sending status information is stored in the register indicated as "C" in FIG. 7, which is set by the frame sending status management part 33 to indicate whether a frame is being sent ("1") through each input line.

Next, the frame sending status management part 33 of the scheduler part 3 has a bit mapped register (the initial value being "0") to show the above frame sending status corresponding to each of the input lines. When the bit of this register corresponding to the input line determined by scheduling is "0" ("0" part scheduling for the first packet of a frame), "1" is set to the register. When scheduling for the last packet of a frame is performed, this bit is cleared. With this register, it is possible to find that input lines for which "1" is set by this register are the lines through which a frame is being sent Whether certain scheduling is for the last packet of a frame or not can be found by the process shown in FIG. 8. This process is executed in the frame sending status management part 33 and has the start pointer SP, and the end pointer EP, corresponding to each of input lines, and a link table in which frame lengths are set.

This link table plays the roll of a frame length counter, where the start pointer, SP, and the end pointer, EP, each indicates the starting address and the ending address, respectively, for each input line in the link table. Frame length for each input line is managed in the link table, and the frame length value is decreased when scheduling is determined. When the value becomes "0", such scheduling is regarded as that for the last packet of the frame.

To describe the operational example more specifically, let us think that requested information of frame lengths "2→5→3" has arrived for input line #0 and requested information of frame lengths "3→5" has arrived for input line #N−1 and that such information is set in the link table.

Figure 8:
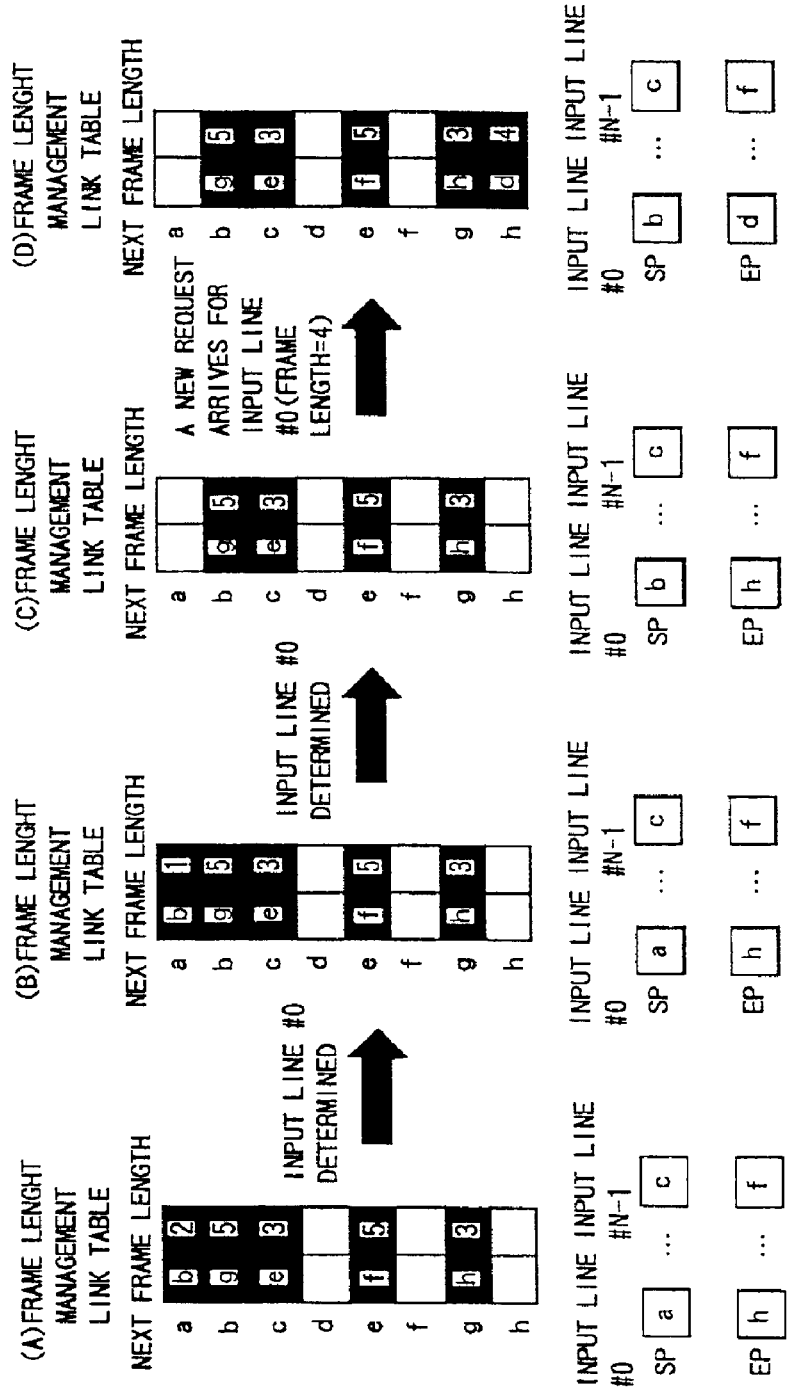
FIG. 8 is a diagram for describing a management method by a scheduler part.

Now, consider that input line #0 is determined as a result of the scheduling process. In this case, referring to the start pointer SP of the corresponding input line, the value "a"

indicated by the start pointer SP is the address in the link table; then the frame length information is referred to and updated (reduced by one) (refer to FIG. 8 (A)).

In the next scheduling cycle, when input line #0 is selected again and reduction in the link table is carried out, similar to the above processing, the frame length become "0". By this value "0" for the frame length, it is judged whether scheduling is for the last packet of the frame or not, and the frame sending status register for input line #0 is cleared. Then, the start pointer, SP, for input line #0 is updated to the value that is set in the field "Next" (refer to FIG. 8 (B)).

Further, when new requested information arrives, the frame length and the next address is written to the address indicated by the end pointer EP, and the end pointer EP is updated (refer to FIG. 8(C)). By repeating the above process, it is judged whether scheduling is for the last packet of the frame or not (refer to FIG. 8 (D)).

Now, in the above operation example, the process shown in FIG. 8 is performed by the frame sending status management part 33 of the scheduler part 3, however, it can be executed by the input buffer part 1. In that case, the above process is performed when a packet is sent from the input buffer part 1, and when a packet is judged as the last of the frame, information as such is sent to the frame sending status management part 33 of the scheduler part 3 together with requested information.

Next, referring to FIG. 7 scheduling operation by the frame is described. It is assumed that, at time T=a, all input lines are undetermined, scheduler part #1 and scheduler part #2 have both received requested information from all the input lines, and all input lines are in such a state that frames have not yet sent.

SRR (Sequential Round Robin) method can be adopted as the scheduling algorithm. This SRR method give the priority for each of input buffer parts, and then determine which logical queue corresponding to which output line readouts in an input buffer have a high order of priority based on the round robin control executed according to input load. The orders of priority are given to the input buffer parts for each time slot in a certain sequence. For the details of this scheduling algorithm, Japanese Patent Application No. Hei-10-355888 (Dec. 15, 1998), Japanese Patent Application No. Hei-10-245331 (Aug. 31, 1998), etc. can be referred to.

Based on this scheduling algorithm, one among those undetermined input lines, in which requested information was provided and no frame was sent out is selected. That is, the first detected input line that is searched for from input lines indicated by the pointer, and can meet the above-mentioned conditions is selected.

In the example shown in FIG. 7, it is assumed that scheduler part #2 has selected input line #3. As a result of that, "1" is set to both register C of the frame sending status information and register A of the undetermined selection information where each of these registers corresponds to input line #3, and the input line number for which scheduling is determined is held. Hereafter this holding register is referred to as the scheduling register. Further, in parallel to the above, scheduler part #1 selects input line #2 in a similar way as above, and updates each of register C of the frame sending status information, register A of the undetermined selection information, and the scheduling register.

On the next scheduling process, if the scheduling register has been already set, the set input line is selected. Furthermore, if it has not been set, scheduling is performed for a line among those input lines undetermined and requested through which no frames are being sent, that is the frame sending status information register C is "0".

In this example, since the scheduling register is set during the previous scheduling process, on the next scheduling process, the input lines which are set in the scheduling register are selected. In other words, scheduler part #2 will select input line #3 and scheduler part #1 selects input line #2. In addition, when a notification of the last frame is received from the frame sending status management part 33, this scheduling register is cleared.

As a matter of course, in a scheduling process for scheduler part #4 and scheduler part #3, it is not possible to select either input line #2 or input line #3 for either of which the frame sending status information is set.

In the processes as explained above, since successive scheduling for one frame is performed for one input line and no input line through which a frame is being sent is selected, readouts by the frame are realized and high throughput is achieved.

Figure 9:
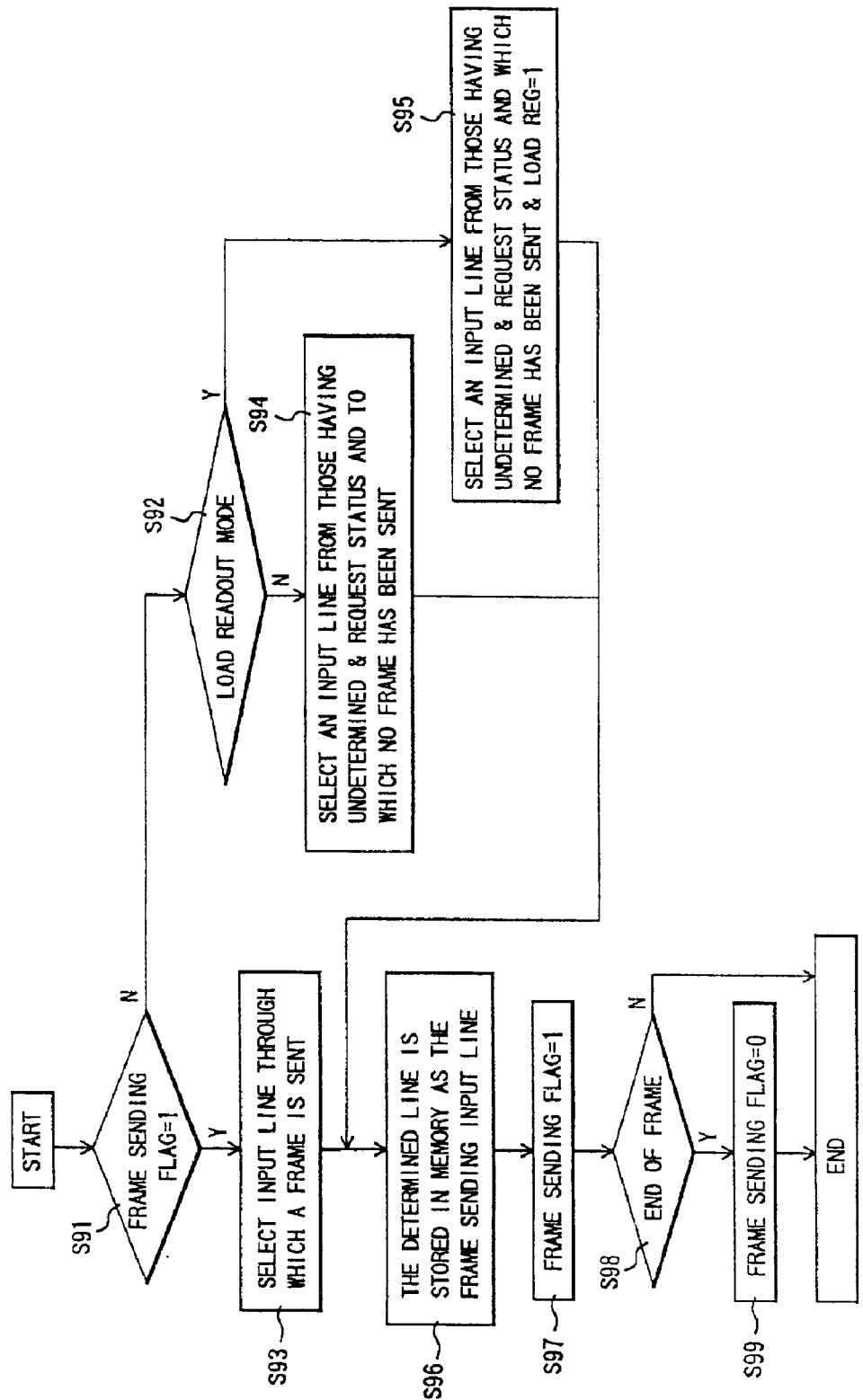
FIG. 9 is a flowchart for describing processing steps of scheduling.

FIG. 9 shows the flow of scheduling process. In a scheduling process, first it is judged whether the frame sending (frame being sent) flag is set or not (processing step S91). The flag initially is in reset status, therefore, judgment process of scheduling mode is performed in S92.

If it is not in load observation mode (load readout mode) an input line is selected from among those that are undetermined, a request exists for, and no frame is being sent through (S94) If it is in load observation mode, an input line is selected from among those that are undetermined, a request exists for, no frame is being sent through, and those for which the content of the accumulation counter (LD. reg in FIG. 19) is greater than one (S95).

Next, in S96, the determined input line that is selected is held as the input line that a frame is being sent through and, in S97, the frame sending flag is set. Then, in S98, it is judged whether it is the frame end. If it is the frame end, the frame sending flag is cleared and the process is terminated (S99).

On the other hand, if it is not the frame end, in the next scheduling process, the judgment of S91 is performed again. Here, since the frame sending flag has already been set, in S93, the input line that has been held in S96 is selected. Then, following the process of setting the frame sending flag in S97, judgment of frame end is performed in S98; after that, the process above is repeated until frame end is reached.

The scheduling results of the above process are held for each pipeline sequence, and the end of each pipeline sequence (slots indicated by the bold lines in FIG. 7), the results are reported to the result switching part 4, and the result information of readout instruction is notified to the determined input buffer part.

In the scheduling process explained above, the scheduling results determined at the same time differed. A process where scheduling is performed for the same input line is explained by referring to FIG. 10.

Normally, since the undetermined selection information is referred to, it is never the case for scheduler part 3 corresponding to different output lines to select the same input line. However, as explained above, in undetermined status, it is possible to select the same input line depending on scheduling process since all input lines to all scheduler parts are notified as undetermined.

Figure 10:
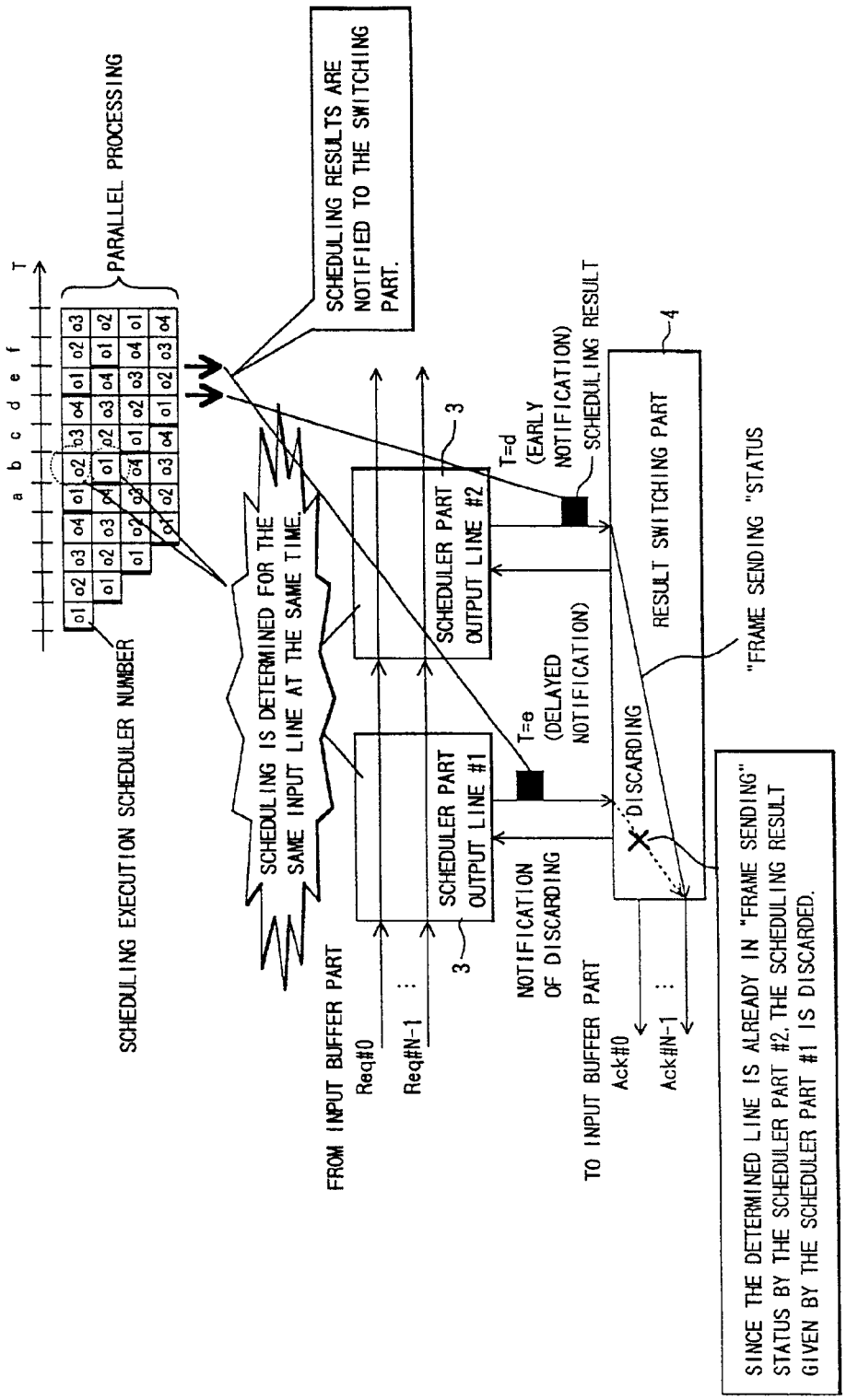
FIG. 10 is a diagram for describing control of discarding at a time of collision.

In the example shown in FIG. 10, at time T=b, scheduler part #2 and scheduler part #1 are performing scheduling to the same input line #N−1. The result of this scheduling is held for each pipeline as explained above, and is notified to the result switching part 4 at the end of pipeline process. Therefore, the result of pipeline sequence #0 is notified at T=d, and the result of pipeline sequence #1 at T=e. In other words, the scheduling result of scheduler part #2 is notified to the result switching part 4 before the scheduling result of scheduler #1.

The result switching part 4 comprises the frame sending management part 42 (refer to FIG. 4) similar to the frame sending status management part 33 (refer to FIG. 3) of each scheduler part 3, and manages whether a frame is being sent through each of the buffer input parts 1 by the control as below.

In other words, the result switching part 4, when new scheduling result information arrives from the scheduler part 3, sets "1" to the register for frame sending management and clears it when the result for the last packet of the frame arrives. The result switching part 4 regards the period during which "1" is set as frame is being sent. The result switching part 4 is not required to perform frame length management control as in the operation example above. In this case, the result judged by the scheduler part 3 (whether scheduling is for the last packet of the frame or not) is notified to the result switching part 4 together with the scheduling result. The result switching part 4 manages the above frame sending status based on the information.

In the result switching part 4, at time T=d, based on the arrival of result from scheduler #2, the frame in-sending flag ("1") is set to the frame sending management register for input line #N−1 and, at the same time as that, the scheduler number (#2) is held. When, at time T=e, the scheduling result for input line #N−1 arrives from scheduler #1, the frame sending status information and the scheduler number are checked. When a frame is being sent ("1") frame sending management part #N−1, and the held scheduler number and arrived scheduler number are different, instructs the discarding processing part 43 (refer to FIG. 4) to discard the arrival result (scheduling result).

In this example, since the held scheduler number is #2 and the arrived scheduler number is #1, the scheduling result arrived from scheduler #1 is discarded. After discarding, the result switching part 4 notifies the scheduler part 3 of the discard. At this time, the scheduler part 3 does not execute the process which is performed when scheduling is completed (such as decrementing the number of requests).

As shown above, even when scheduling is performed to the same input line at the same time, other scheduling result than the first one that is notified to the input buffer part 1 will not be notified to the input buffer part 1, therefore, readout for each frame is possible.

Extended Configuration of Scheduler

Figure 11:
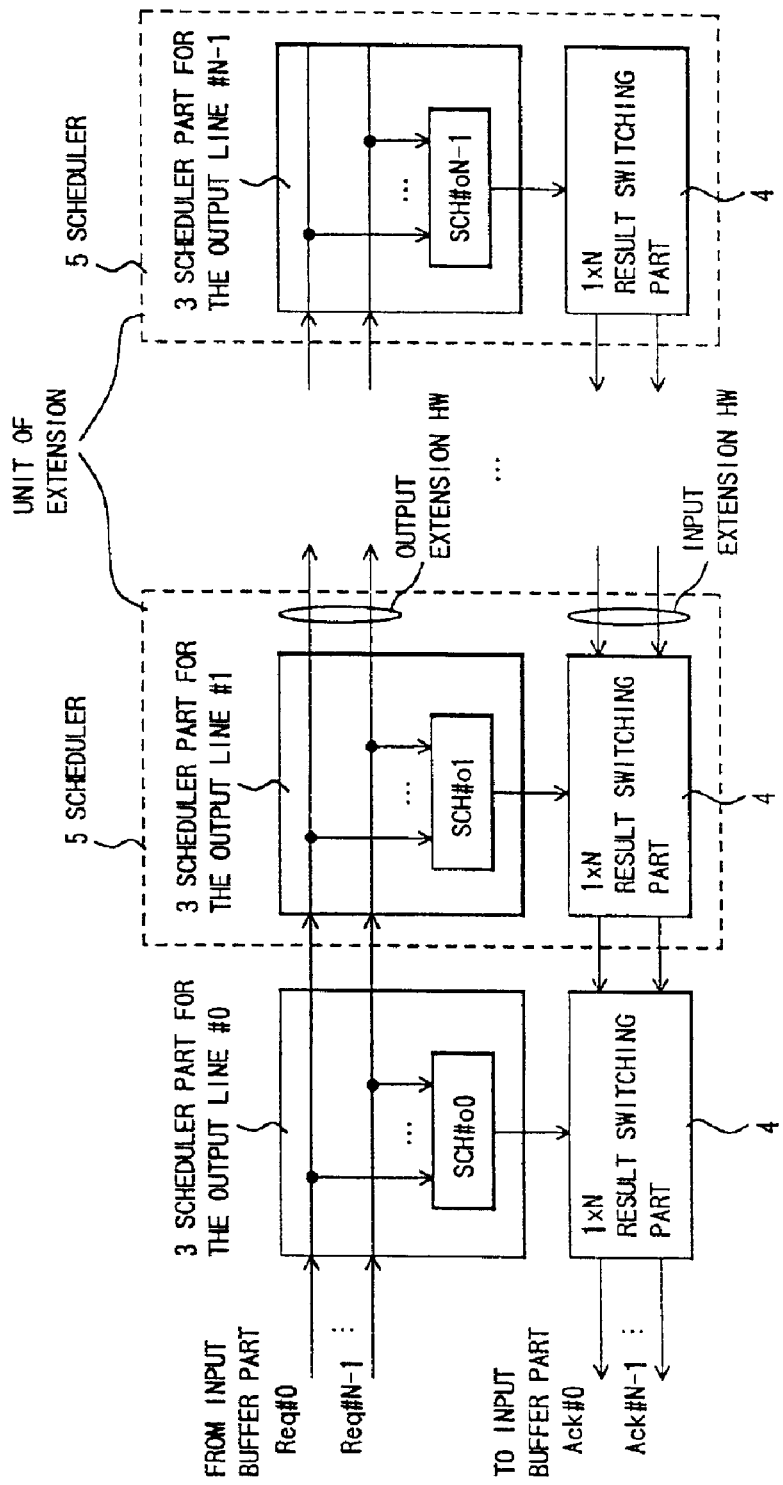
FIG. 11 is a block diagram to show an example of an extended configuration of the scheduler.

Next, a method of extended configuration of the scheduler 5 shall be explained referring to FIG. 11. The scheduler part 3 can be provided for each output line of a packet switch. In this case, to avoid highly increased volume of information between the input buffer part 1 and the scheduler part 3 (notifications of requests and scheduling results), it adopts a configuration such that requested information from each input buffer part 1 (Req #0 . . . Req #N−1) is received by one scheduler part 3 and then notified to other scheduler parts 3. Further, the scheduling result information (Ack #0 . . . Ack #N−1) is also notified only by way of the result 'switching part 4 instead of each scheduler part 3 notifying.

Each scheduler part 3 corresponding to an output line comprises input highway (HW) for scheduling requested information and extended output highway (HW). By outputting scheduling requested information as the way it is received, requested information is notified to each scheduler part 3. Further, by providing, corresponding to each output line, the result switching part 4 to notify the input buffer part 1 of scheduling results, the result switching part 4 is formed which has a 1×N configuration consisting of one input highway, N output highway, and N extended input highway.

Upon extension, adding the scheduler part 3 and the result switching part 4 in a set (areas surrounded by the dotted lines in FIG. 11) enables extension of the scheduler (scheduling control device) 5. Furthermore, such extension can be made as necessary without stopping the parts currently in operation which makes in-service additions possible.

Figure 12:
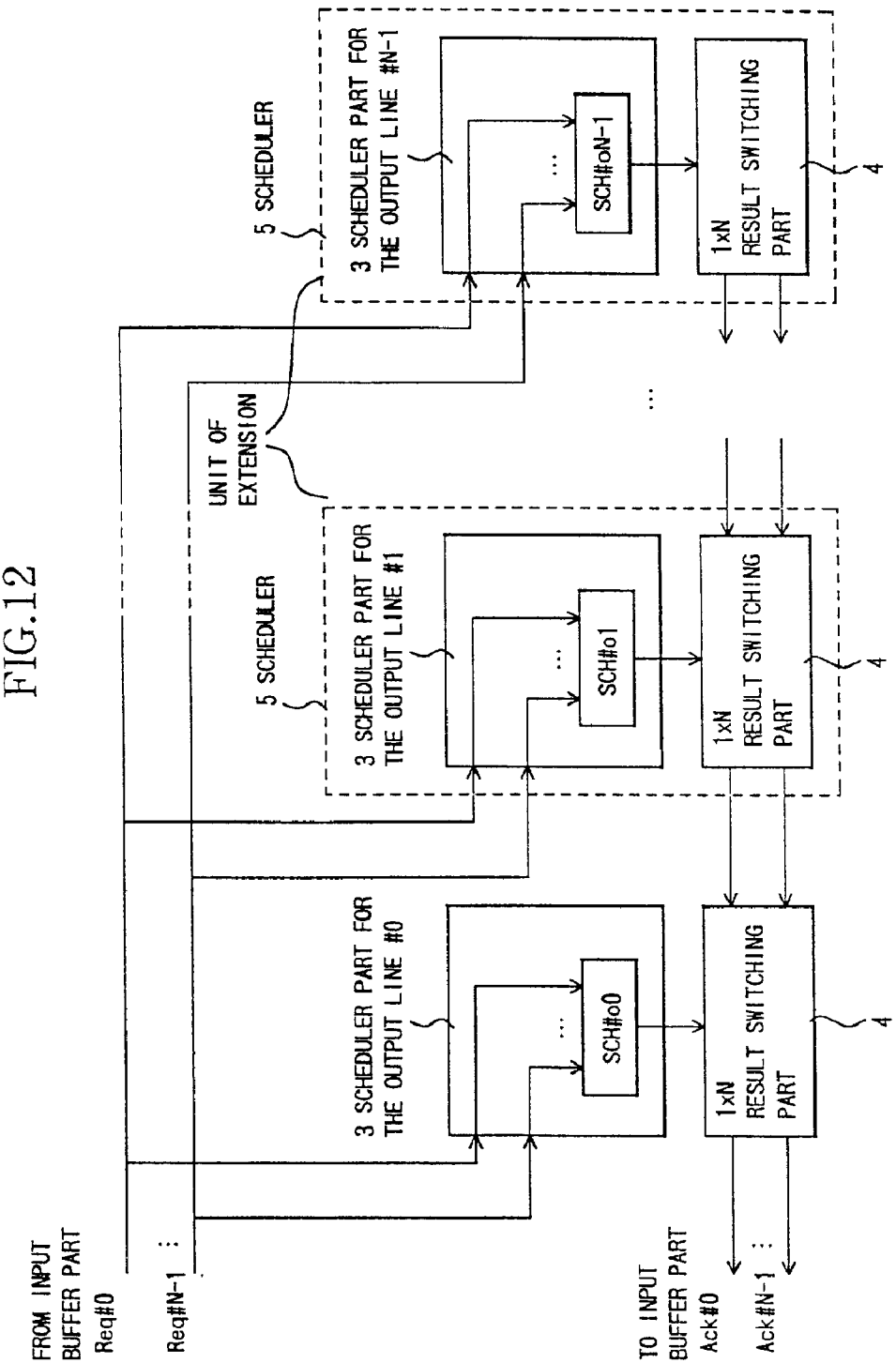
FIG. 12 is a block diagram to show another example of an extended configuration of the scheduler.

In the above extension example, the extended output highway is provided in the scheduler part 3. However, as shown in FIG. 12, a bus configuration can be adopted where the same requested information is branched to each scheduler part 3.

Mixed Reception of Variable Length Packets and Fixed Length Packets

Figure 13:
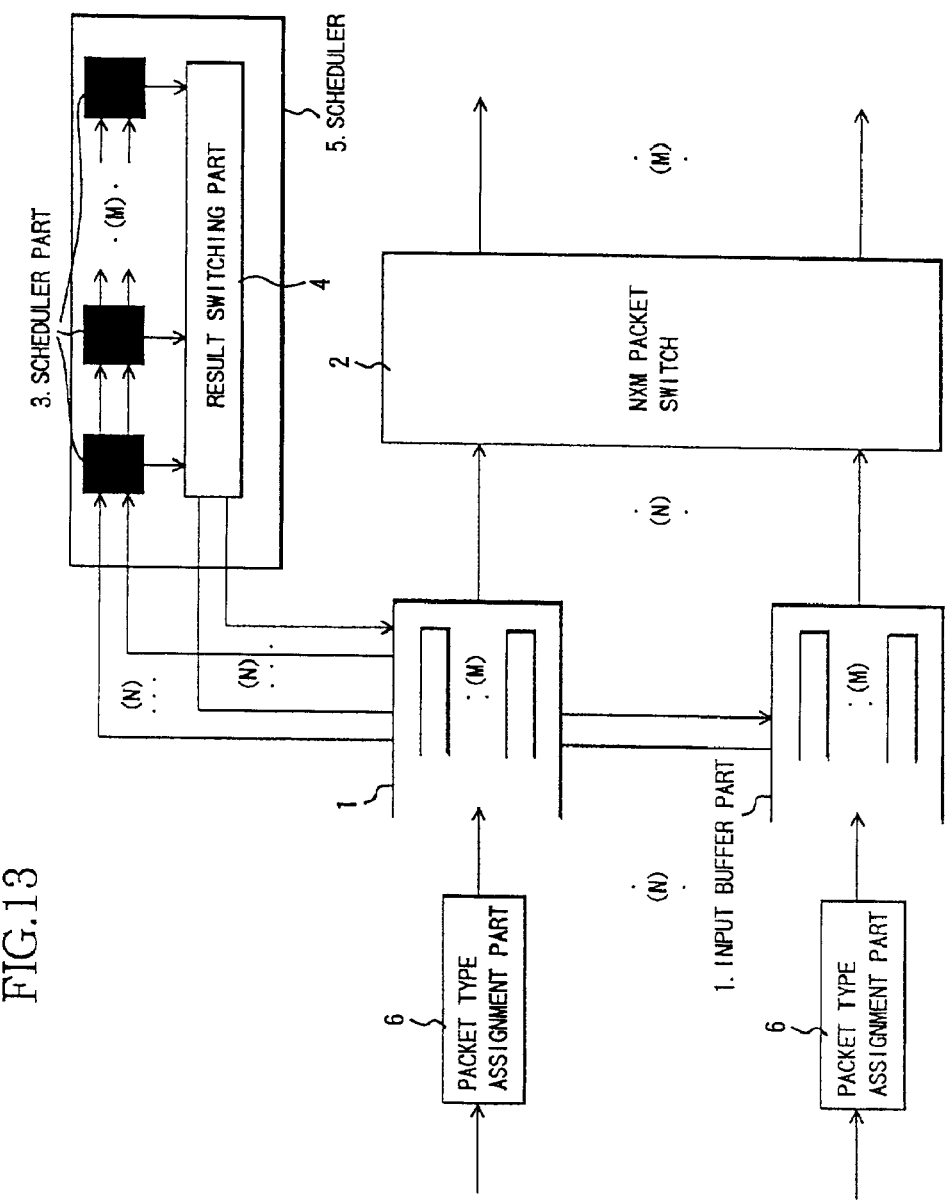
FIG. 13 is a diagram for describing mixed reception of variable length packets and fixed length packets.

Next, explanation is given, referring to FIG. 13, about a configuration example of input buffer type packet switch device where mix of variable length packets and fixed length packets is received. For example, fixed length packets such as ATM (Asynchronous Transfer Mode) cells do not need to construct frames when outputting them from a packet switch device. A case is explained about mixed reception of such fixed length packets not requiring conversion to frames and variable length packets such as IP packets requiring conversion to frames.

If reception service differs for each interface (input interface part), for such interface not requiring conversion to frames in receiving ATM cells, the packet type assignment part 6 which assigns to all packets an identifier meaning the last packet of the frame is provided in such as input interface part. This identifier can be easily realized by using an idle area of the packet header or providing a different route for notification to the scheduler part. As a result, in the input buffer part 1 or scheduler 5, a fixed length packet can be regarded as a variable length packet with a frame length=1 for processing it, which makes it unnecessary to change the scheduling process considering the service.

Variable length packets are divided into fixed lengths in the front stage of the packet type assignment part 6. Each of the divided packets is assigned a header for within the device except for the last packet of one frame to which a frame end identifier is assigned by the packet type assignment part 6. Therefore, a mix of data packets of various services can be received in the same switch.

In the example explained above, it is decided whether to assign a frame end identifier for each interface type. However, in the case where packets of a plurality of services are received by the same interface, it is possible to decide whether to assign a frame end identifier to all packets for each service by distinguishing the service types. Here, each of other elements of configuration of the input buffer type packet switch device can adopt the configuration shown in FIG. 2 or other examples explained above.

Scheduler Part with QoS Control Function

Figure 14:
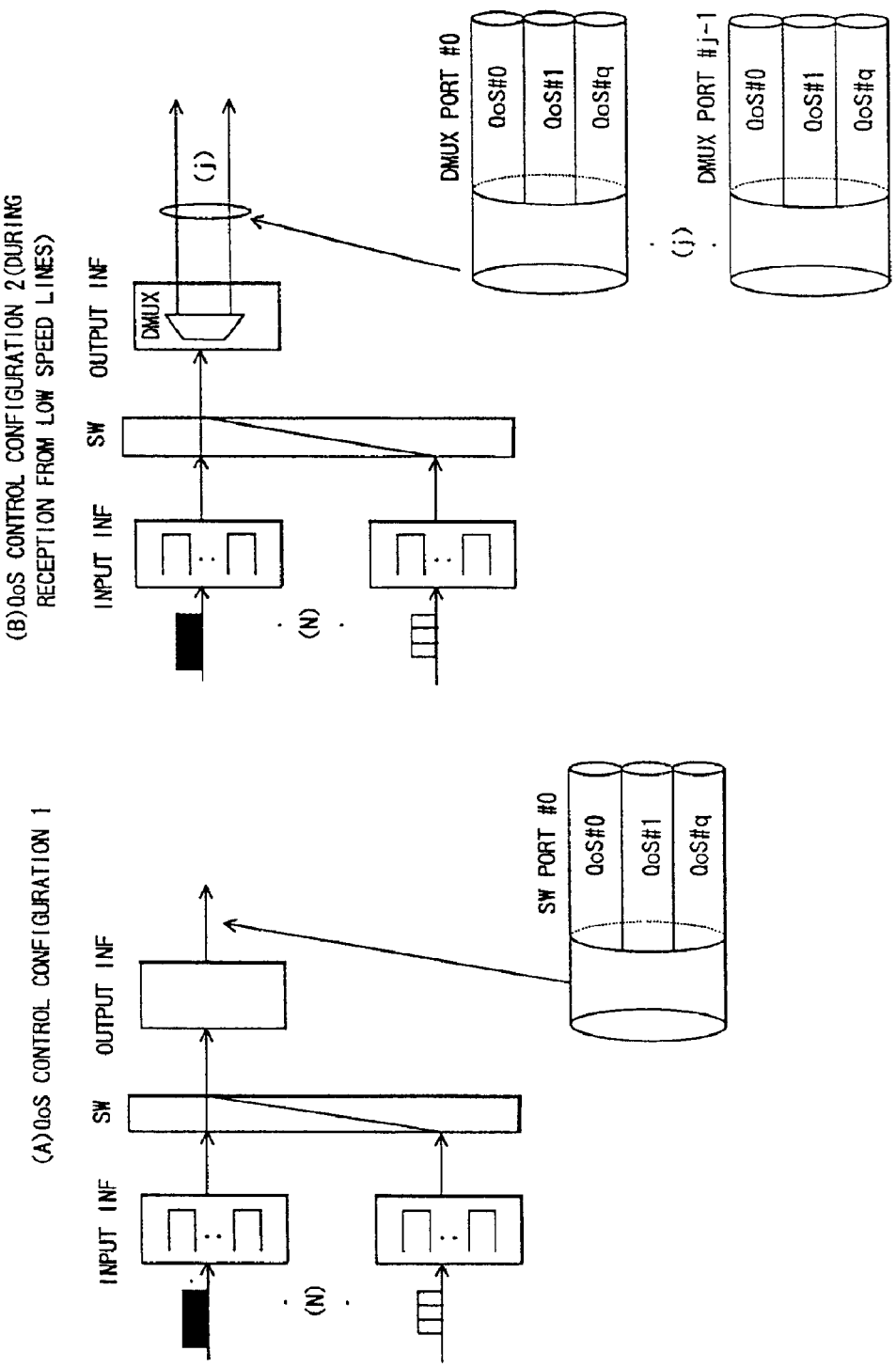
FIG. 14 is a diagram for describing QoS control.
Figure 15:
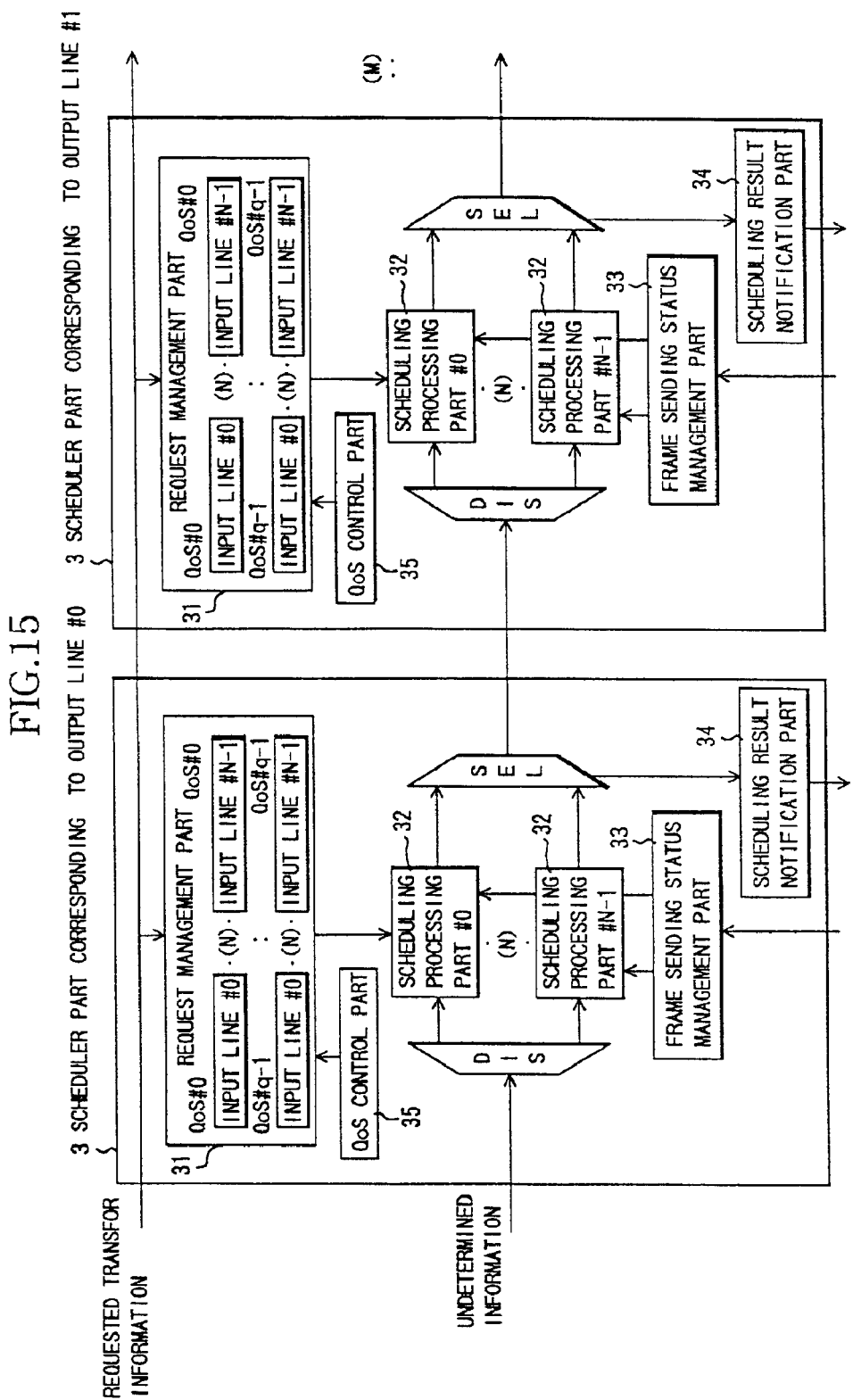
FIG. 15 is a block diagram to show configuration of a scheduler part having QoS control function.
Figure 16:
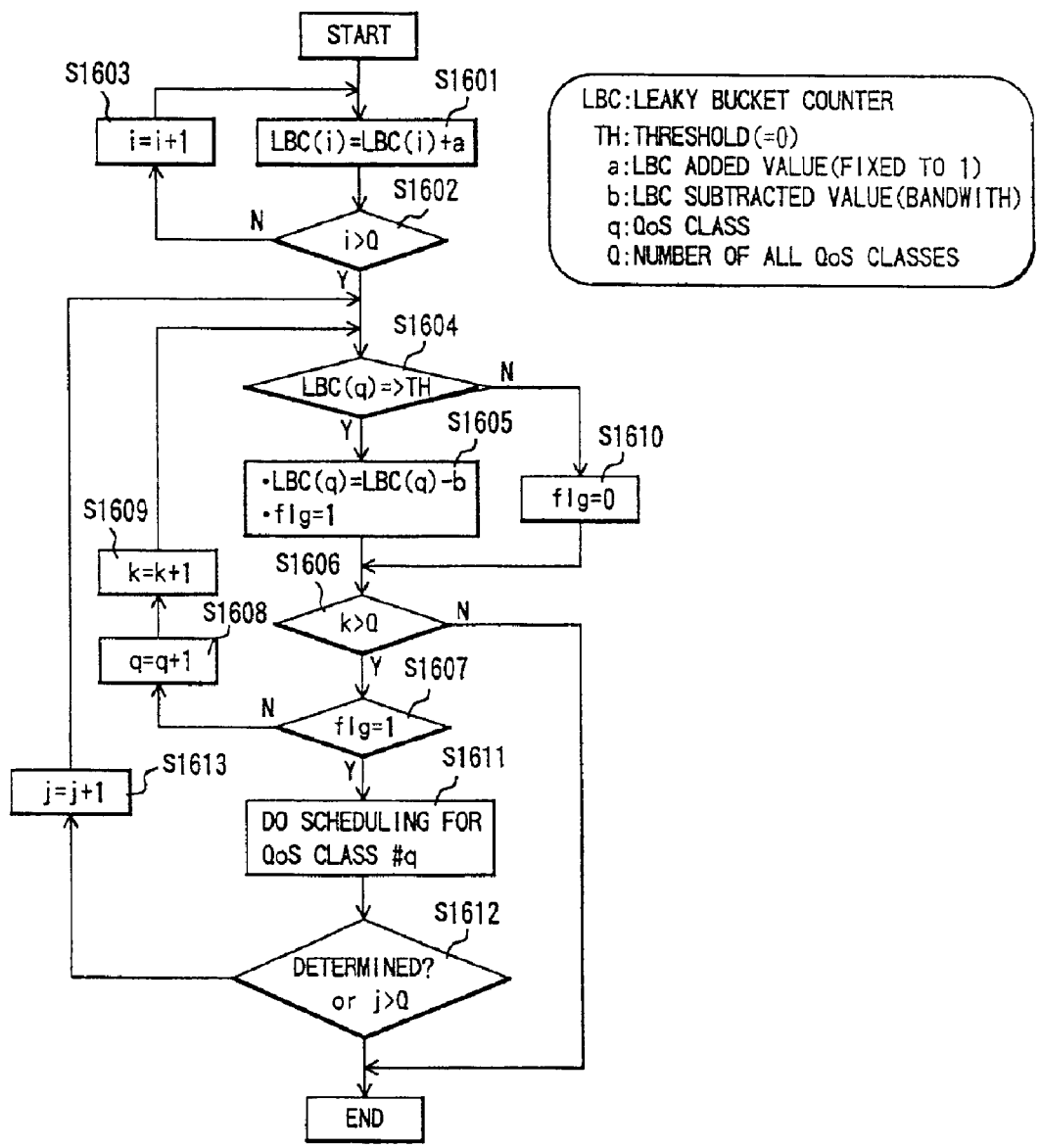
FIG. 16 is a flowchart for describing processing steps of QoS control.

Next, a method of QoS control configuration shall be explained by referring to FIGS. 14, 15, and 16.

In general, as shown in FIG. 14 (A), QoS control is executed so that QoS is guaranteed in the output lines of an input buffer type packet switch device. QoS control performs shaping (limitation of bandwidth) of output data to the bandwidth predetermined for each of the QoS classes, to guarantee quality of each service class by guaranteeing from "best effort" service to "guaranteed" service which places more importance in bandwidth and delay, and send QoS classes placing importance in delay are sent out with priority to guarantee the quality of each QoS class.

In a buffer input type packet switch device, since basically it does not have buffer part on the output side, QoS guarantee on the output lines of the switch device is realized by performing QoS control of the output lines in advance and then performing scheduling process when packets are read out from the input buffer part.

Here, a case of performing QoS control in the scheduler (scheduling control device) shall be explained. Referring FIG. 15, the scheduler part 3 of the scheduler manages, in the request management part 31, requested information received from the input buffer part 1 for each input line and each of QoS classes. The QoS control part 35 satisfies the preset bandwidth and decides the QoS class to be output according to the order of priority of the priority control.

In the scheduling process part 32, scheduling process is executed based on the requested information of the designated QoS class. For example, for output line #a, QODS class #0 is the highest in the order of priority and QoS class #1 is the next highest. Because QoS class #0 is the first in the priority, if a request is made for QoS class #0, the QoS class subject of scheduling is decided as QoS #0. If there is no request for QoS class #0, QoS #1 is the QoS class subject of scheduling.

When performing bandwidth control, with using the circuitries (for example, a leaky bucket circuitry) for which a readout instruction is given in the set bandwidth (=1/interval of bandwidth) check whether each QoS class satisfies the interval of sending. QoS class with high priority among the QoS classes satisfying the interval of sending is the QoS subject of scheduling.

As shown above, when reading out packets from the input buffer part 1, performing scheduling by reflecting the QoS control result of the output lines can realize QOS guarantee of the output lines even without a buffer part on the output line side, and limit the point of quality degradation to the input buffer part 1 only. This makes need for processes such as call-reception control limited to the input buffer part 1 only, and holds a merit to ease controls such as call-reception control.

Furthermore, as shown in FIG. 14 (B), in a case where a logical multiplexing part (DUMX) for low speed lines exists on the output side of the packet switch device, in other words the output interface part (output INF), a control similar to above can be realized.

In this case, in the request management part 31 of the scheduler part 3, requested information is managed for each of the output ports of the DMUX (#0 ... #j−1), each of the input lines (#0 ... #N−1), and each of the QoS classes (QoS #0 ... #q−1). The request management parts 31 are provided at a quantity of 31 corresponding to the number of output ports. Before performing scheduling, a DMUX port for scheduling is decided first. For example, in case of a DMUX of mod. 4, DMUX ports are selected, with four time units as one cycle, in the order as: port 1→port 2→port 3→port 4→port 1→port 2 ....

The scheduling process part 32 performs scheduling for the designated port number (#0 ... #j−1) using requested information of QoS class (QoS #0 ... #q−1) instructed by the QoS control part 35, and by doing so, QoS guarantee is realized when accommodating low speed lines.

The QoS control flow is shown in FIG. 16. Processing steps S1601, S1602, and S1603 indicate the leaky bucket process for each of the QoS classes. In S1601, added value a (in this case, +1) is added to the leaky bucket counter (LBC) of each of the QoS classes. In S1602 and S1603, the QoS classes are changed to perform the process for each QoS class.

In S1604, it is judged whether the value of LBC exceeds the set threshold value (TH=0). In a state where this threshold value is exceeded, the indication is that readouts are possible at a certain rate, and the flag is set to "1" as readable QoS and the LBC is decremented (−b) in S1605. The subtracted value b of LBC is obtained by dividing by the rate of the line and the QoS rate of the line.

When LBC falls short of the threshold value, the flag is set to "0" in S1610. Then flag judgment is performed in S1607. If the flag is set to "1", a scheduling process is performed in S1611; otherwise, the QoS class (q) is changed in S1608 and the process is repeated from S1604.

S1606 and S1609 are both judgment steps to end the process in case all QoS classes are below the threshold value. After performing the number of processes worth the number of QoS classes, transition is made to end the process.

On the other hand, if the flag is judged as "1" by the flag judgment in S1607, in S1611, scheduling process of the QoS for which this flag is set to "1" is performed. Then, in S1612, it is judged whether it is determined by the above scheduling process. Furthermore, if determined, the process is ended; if not determined, the process is repeated from S1604 by way of S1613. In S1612, judgment if j>Q is made. This is a step to end the process when all QoS classes are undetermined.

Scheduler Part Having Load Observation Function

Figure 17:
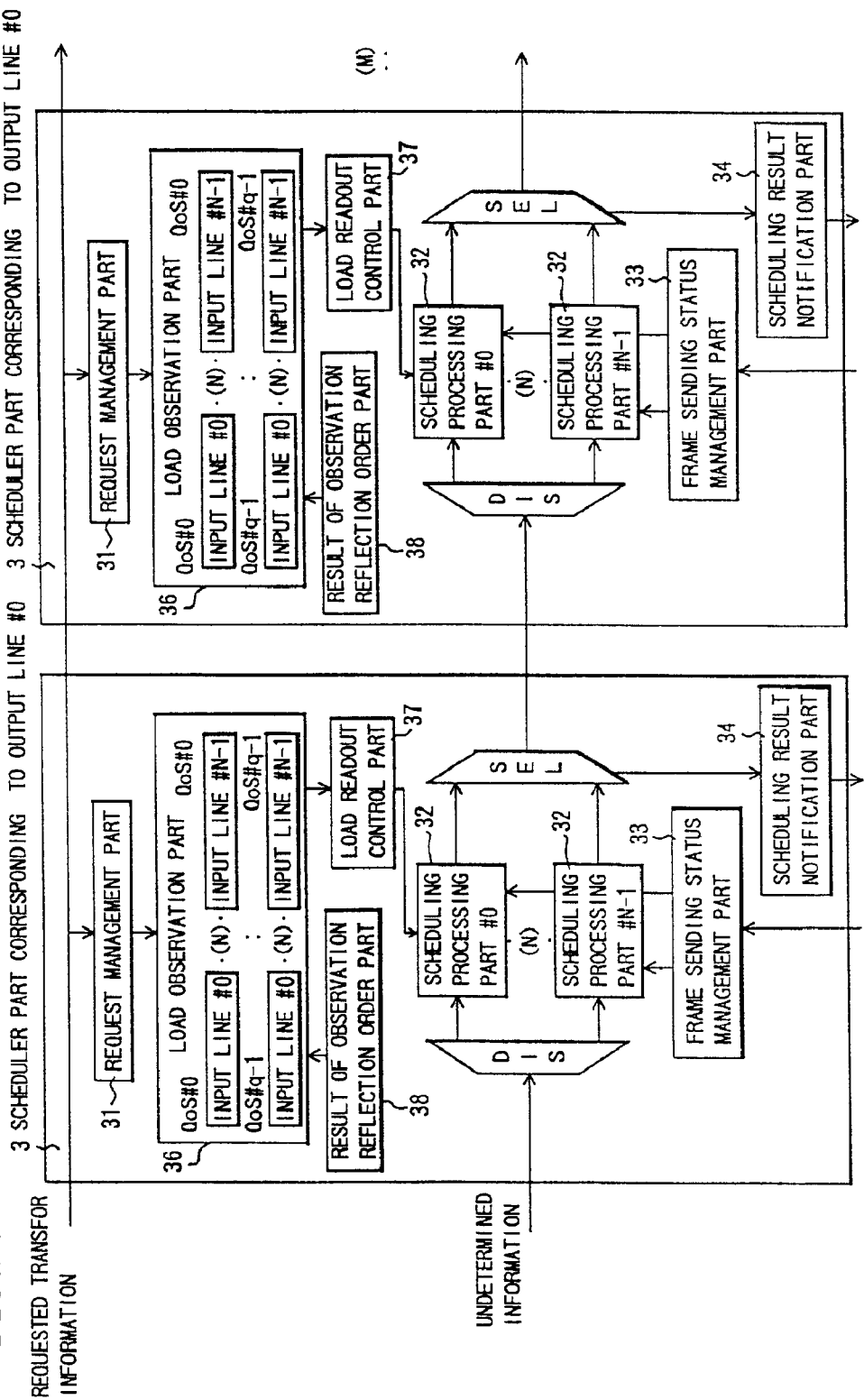
FIG. 17 is a block diagram to show configuration of a scheduler part having load observation function.
Figure 18:
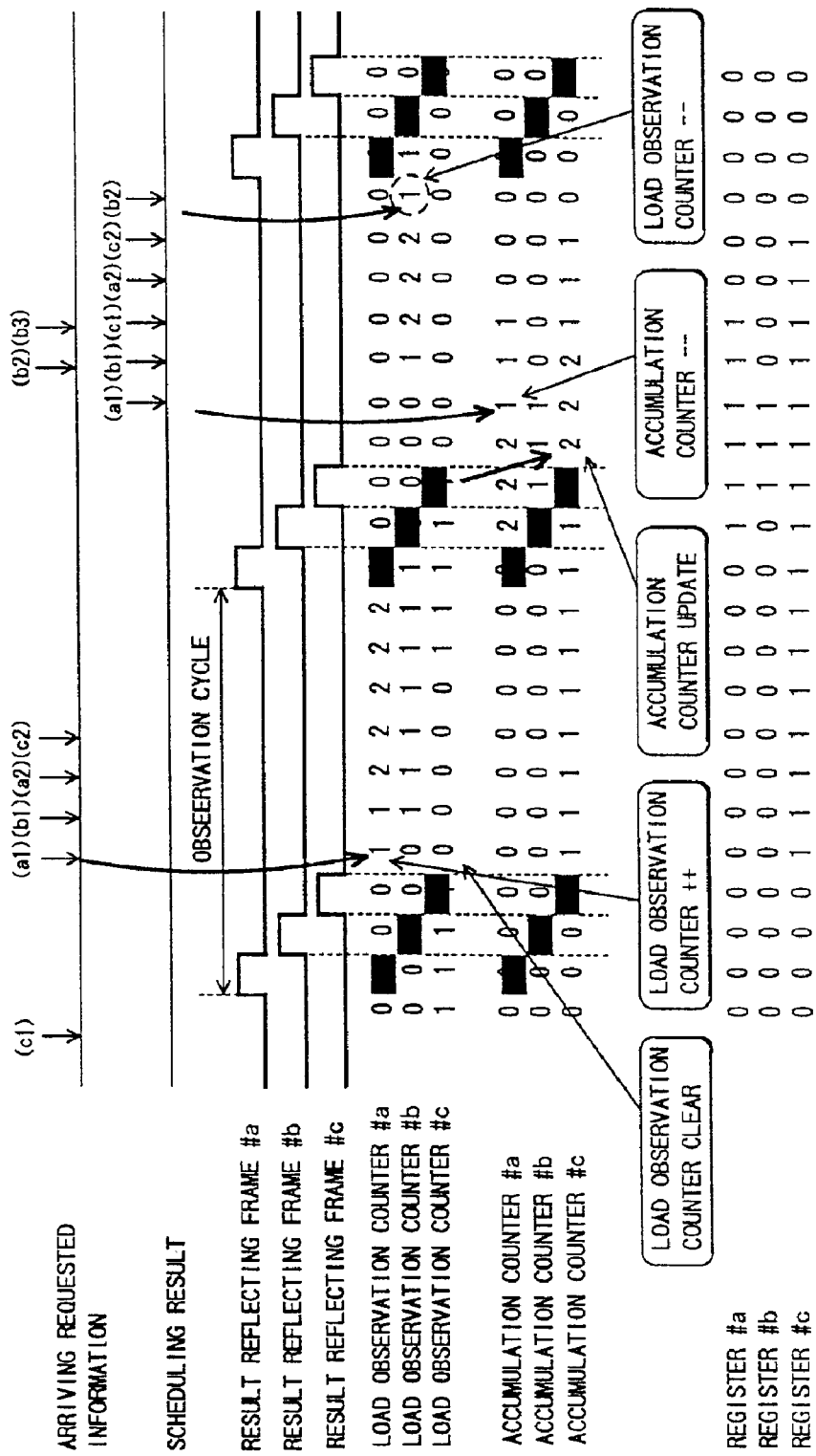
FIG. 18 is a diagram for describing operation by the load observation part.
Figure 19:
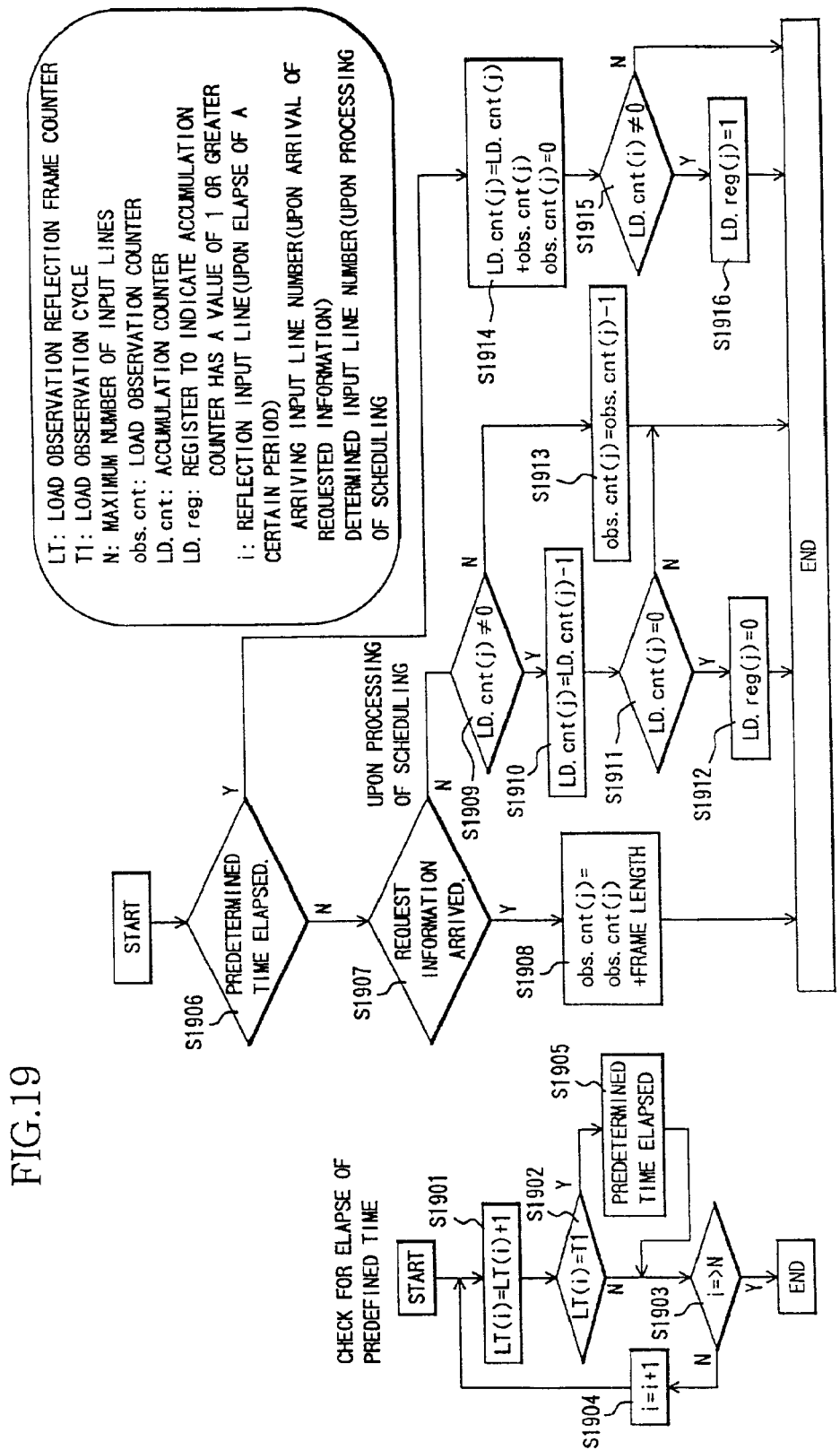
FIG. 19 is a flowchart for describing processing steps of load observation control.

Next, a scheduler part having load observation function is explained by referring to FIG. 17, FIG. 18, and FIG. 19. This is for knowing if packets arrive in an uneven load condition from a plurality of input lines to an output line, selecting the input lines evenly reduce the throughput of those input lines with higher loads. To avoid such reduction of throughput, input lines are determined according to their loads.

Referring to FIG. 17 which shows a configuration example of a scheduler part having a load observation function, the load observation part 36 of the scheduler part 3 counts the occurrence of requested information arriving from the input buffer part within a predetermined time for each of both the input lines and the QoS classes. Then, the load observation part 36, after elapse of the predetermined time, reflects the observation results to the load readout control part 37. The load readout control part adds the observation results to the accumulation counter (details provided later) in certain cycle, and has a counter (details provided later), for each of both the input lines and the QoS classes, from which the value "1" is subtracted on each scheduling.

Therefore, if the reflection timing above is common to all input lines, since the processes of addition to the counters will take place all at once, it is necessary to prepare the accumulation counters individually (in parallel) in relation to the processing speed.

The observation result reflection instruction part 38 gives instructions to the load observation part 36 shifting the reflection timing by certain unit of time for each of the input lines. By this control, the timing of any reflections do not overlap with one another for any input line, which allows configuration of accumulation counters using memories of a low hardware scale.

Next, referring to FIG. 18 which shows an operation example, the load observation counter performs increment when receiving requested information, and decrement (−1) only when the accumulation counter has "0" upon determination of scheduling. The accumulation counter adds observation results in a certain cycle, and is decremented upon determination of scheduling, and manages number of requests (load) within the predetermined time.

The reflection timing above is indicated as a result reflection frame. In the position where the reflection frame is at high level "H", both the load observation counter and the accumulation counter are added, the accumulation counter is updated, the load observation counter is reset, and reflection is made to registers. This register is a bit-mapped register corresponding to each of the input lines, and set "1" to it when the accumulation counter has value greater than "1".

In other words, when scheduling is performed as many times as the number of requests that arrived within the predetermined time (strictly, it includes the number of requests left over from the previous observation cycle), the register is set to "0". Thus, when performing scheduling, selecting from those input lines for which "1" is set in this register does ensure controlling the number of scheduling so that it does not exceed the number of requests arrived within the predetermined time. This register corresponds to load REG (=1). In other words, the number of scheduling can be controlled according to the load (the number of requests that arrived within the predetermined time).

In FIG. 18, since a packet indicated by the code b1 has arrived within the observation cycle, in the following cycle scheduling for input line #b is performed for no more than 1 packet until the number of scheduling all the requested information that arrived in the previous cycle is performed. The reason the scheduling for the second packet b2 is performed is that scheduling for all the requests arrived in the previous observation cycle has been made in the period of time just before the current one. The load observation counter, accumulation counter, and register above is provided in the load observation part 36.

The load observation control flow is shown in FIG. 19. In processing steps S1901 through S1905, it is judged whether the predetermined time has elapsed or not. In S1901, the load observation reflection frame counter LT is incremented for each of the input lines in each packet time. In S1902, it is judged whether the load observation counter LT is equal to the set value of load observation cycle T1. This process ends after repeating the sequence of processes for a number of times of input lines (N).

Next, the load observation control S1906 through S1916 is explained. In S1907, it is judged whether an arrived event of requested information from the input buffer part 1 or a determining event of scheduling from the scheduler part 3 has occurred. If requested information arrives, in S1908, the frame count information of the arrived requested information is added to the load observation counter obs.cnt to measure the number of arrived requests within the predetermined time.

When it is judged that the predetermined time has elapsed in S1906, in S1914 the value of this load observation counter obs.cnt is added to the accumulation counter LD.cnt and then the load observation counter obs.cnt is cleared. In S1915, if the accumulation counter LD.cnt is not "0", in S1916 the register LD.reg to indicate that the accumulation counter LC.cnt is greater than "0", is set. This register LD.reg is used in the load observation mode of the scheduling process.

On the other hand, in S1096 if it is judged as a determining event of scheduling of the scheduler part 3, first, in S1909 it is judged if the accumulation counter LD.cnt is "0". If the accumulation counter LC.cnt is "1" or greater, in S1910, the accumulation counter LD.cnt is decremented (−1); if the accumulation counter LD.cnt is "0", in S1913 the load observation counter obs.cnt is decremented.

When the accumulated counter, LD.cnt, is decremented, in S1911 it is judged if the accumulated counter LD.cnt is "0"; and when the counter value becomes "0", in S1912 the register LD. reg to indicate that the accumulation counter LD.cnt is greater than "1" is cleared.

Although only a few embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. A packet switch device having a plurality of input lines, a plurality of output lines and a switching unit and where a frame of data received on an input line of the plurality of input lines is stored as one or more fixed length packets in an input buffer corresponding to the input line, where a plurality of input buffers are provided corresponding to the plurality of input lines, each input buffer of the plurality having a buffer memory that is logically divided into queues corresponding to the plurality of output lines, the buffer memory for temporarily storing the fixed length packets, and the switching unit switching the fixed length packets read from the buffer memory to the plurality of output lines, the packet switch device comprising:

a plurality of schedulers corresponding to the plurality of output lines; and at least one result notification module for notifying the input buffers of the results of a scheduling process performed by each scheduler, wherein each scheduler, comprising:

a scheduling process module in which a scheduling process is executed in a number of parallel processes corresponding to the number of the input lines, the scheduling process for scheduling the sending of the fixed length packets from each input buffer to the switching unit, a sending status management module which manages a sending status of the fixed length packets constituting one frame for each of the input lines, and a request management module for managing requested transfer information being information about the fixed length packets stored in the input buffer for each of the input lines;

wherein, after the scheduling process schedules an input line for sending of a fixed length packet from its corresponding input buffer, the scheduling process continuously schedules the input line until the sending of the fixed length packets constituting the same frame is completed, wherein each scheduling process module executes the scheduling process in a number of parallel processes corresponding to the number of the input lines, and the input line scheduled by a scheduler for setting the fixed length packets constituting the same frame is not scheduled by another scheduler, and wherein each scheduling process module decides which input line and corresponding input buffer will send the fixed length packets on the basis of the requested transfer information from the request management module, information on which input line is not currently scheduled, and the sending status managed by the sending status management module.

2. The packet switch device of claim 1, further comprising: a transmission medium serially connecting the plurality of schedulers and providing undetermined information which is the information on which input line is not currently scheduled; and a further transmission medium connecting the plurality of schedulers with one another for sending status information inputted into the sending status management module.

3. The packer switch device of claim 1, wherein the result notification module comprising:

a control unit for monitoring whether or not the input buffer is sending the fixed length packets that constitute one frame based on the result information from the scheduled sending process; and a discarding process unit for discarding the result information for an input buffer, wherein when notifying the result information for each of the plurality of schedulers to the plurality of input buffers, when the control unit monitoring the result information determines the result information is inputted from a different scheduler when the input buffer has already received result information for sending the fixed length packets that constitute a frame from another scheduler, the control unit instructs the discarding process unit to discard the results information from the different scheduler.

4. The packet switch device of claim 1, further comprising:

a unit for continuously expanding and connecting the plurality of schedulers and the result notification modules as the plurality of output lines increases in a manner where the plurality of schedulers corresponds with the plurality of output lines.

5. The packet switch device of claim 1, wherein a plurality of fixed length packets constituting a frame include a first packet constituting a beginning of the frame and second packets constituting remaining packets of the plurality of fixed length packets constituting the frame, and the packet switch device further comprising:

a unit provided at a front stage of the input buffers for adding a frame end identifier to a second packet when the second packet is also a last packet of the plurality of fixed length packets constituting the frame.

6. The packet switch device of claim 1, wherein the scheduling process module manages, according to a QoS class, the requested transfer information sent from the input buffers, and the scheduling process performs the scheduling process for sending the fixed length packets with respect to the QoS class selected based on the result, of both QoS bandwidth control and QoS priority control in the output lines.

7. The packet switch device of claim 1, wherein each of the schedulers further comprising:

a load observation module for counting a number of occurrences of requested transfer information inputted from the input buffers within a predetermined time; and an observation result reflecting module for instructing a timing to notify the observation result to the scheduling process module, the timing being shifted by a unit of time for each of the input buffers;

wherein the input buffer corresponding to the input line is selected according to a proportion of the number of occurrences of the requested transfer information that is observed.

8. A scheduling control method for scheduling the switching of frames of data from a plurality of input lines to a plurality of output lines where each frame of data arriving on an input line is converted to at least one fixed length packet prior to switching, comprising the steps of:

receiving requests to switch fixed length packets from input lines to output lines where the request includes information of a number of the fixed length packets constituting the frame of data, and an output destination;

executing the scheduling process as a number of processes executed in parallel, the number of parallel processes corresponding to the number of the input lines, and where the scheduling process has scheduled an input line with the number of fixed length packets constituting the frame of data to the output destination, the input line remains scheduled until a last fixed length packet constituting the frame of data is sent;

controlling the scheduling process where an input line currently sending fixed length packets constituting the frame of data to be switched to the output destination will not be scheduled in another scheduling process until the last fixed length packet constituting the frame of data is scheduled; and managing a sending status of the fixed length packets constituting one frame for each of the input lines, wherein each scheduling process decides which input line will send the fixed length packets on the basis of the request information, information on which input line is not currently scheduled, and the sending status.

9. The scheduling control method of claim 8, wherein the scheduling process is executed in a plurality of time units corresponding to a number of the output lines, and is a pipeline process with the number of parallel processes corresponding to a number of the input lines.

10. The scheduling control method of claim 8, further comprising steps of:

receiving QoS information with the receiving requests to switch fixed length packets from input lines to output lines, for each QoS class, and performing the scheduling process with respect to a QoS class selected based on the results of both QoS bandwidth control and QoS priority control of the output lines.

11. The scheduling control method of claim 8, further comprising steps of:

counting a number of occurrences of receiving requests to switch fixed length packets within a predetermined time;

instructing timing to reflect the counted result to the scheduling process, the timing being shifted by a unit of time for each of the input buffers; and selecting the input buffer according to a proportion of the number of occurrences of requests to switch fixed length packets that is counted.

* * * * *